(12) United States Patent
Gananathan

(10) Patent No.: US 12,246,553 B2
(45) Date of Patent: Mar. 11, 2025

(54) OPTICAL SECURITY COMPONENTS, MANUFACTURE OF SUCH COMPONENTS AND SECURE DOCUMENTS EQUIPPED WITH SUCH COMPONENTS

(71) Applicant: SURYS, Bussy Saint Georges (FR)

(72) Inventor: Nelson Gananathan, Aubervilliers (FR)

(73) Assignee: SURYS, Bussy Saint Georges (FR)

( * ) Notice: Subject to any disclaimer, the term of this patent is extended or adjusted under 35 U.S.C. 154(b) by 0 days.

(21) Appl. No.: 18/575,194

(22) PCT Filed: Jul. 11, 2022

(86) PCT No.: PCT/EP2022/069357
§ 371 (c)(1),
(2) Date: Dec. 28, 2023

(87) PCT Pub. No.: WO2023/281123
PCT Pub. Date: Jan. 12, 2023

(65) Prior Publication Data
US 2024/0262123 A1   Aug. 8, 2024

(30) Foreign Application Priority Data
Jul. 9, 2021 (FR) ...................................... 2107518

(51) Int. Cl.
*B42D 25/324* (2014.01)
*B42D 25/328* (2014.01)
(Continued)

(52) U.S. Cl.
CPC ......... *B42D 25/324* (2014.10); *B42D 25/328* (2014.10); *G02B 5/1857* (2013.01); *B42D 25/373* (2014.10)

(58) Field of Classification Search
CPC .. B42D 25/324; B42D 25/328; B42D 25/373; G02B 5/1857; G02B 5/18
(Continued)

(56) References Cited

U.S. PATENT DOCUMENTS

| 4,856,857 A | 8/1989 | Takeuchi et al. |
| 2010/0182221 A1 | 7/2010 | Kaule et al. |

(Continued)

FOREIGN PATENT DOCUMENTS

| EP | 3099513 B1 | 2/2018 |
| EP | 2771724 B1 | 2/2019 |

(Continued)

OTHER PUBLICATIONS

International Search Report issued in International Application No. PCT/EP2022/069357, mailed Sep. 30, 2022 (5 pages).
(Continued)

*Primary Examiner* — Justin V Lewis
(74) *Attorney, Agent, or Firm* — Osha Bergman Watanabe & Burton LLP

(57) ABSTRACT

An optical security component may include a first layer, a diffractive structure etched on the first layer, a second reflective layer covering the diffractive structure. The diffractive structure includes a first pattern consisting of a set of facets arranged to form various subsets of facets, each subset of facets including a facet with symmetry of revolution arranged concentrically. In each group of the subsets of facets, the subsets of facets present, in point regions defined by identical polar coordinates, a local alteration of the surface, such as to produce a recognizable graphic object for a given tilt angle and azimuth angle. The polar coordinates vary from one group to another, so as to produce a dynamic visual effect observable in reflection by change of tilt and/or azimuth.

16 Claims, 13 Drawing Sheets

(51) Int. Cl.
*B42D 25/373* (2014.01)
*G02B 5/18* (2006.01)

(58) Field of Classification Search
USPC .................. 283/67, 70, 72, 82, 94, 98, 901
See application file for complete search history.

(56) References Cited

U.S. PATENT DOCUMENTS

2014/0367957 A1   12/2014  Jordan
2016/0023495 A1*  1/2016  Fuhse .................. B42D 25/328
                                                                                             359/566

FOREIGN PATENT DOCUMENTS

| EP | 3598204 A2 | 1/2020 |
|----|------------|--------|
| FR | 2509873 B1 | 8/1987 |
| WO | 2001003945 A1 | 1/2001 |
| WO | 2015154943 A1 | 10/2015 |
| WO | 2018224512 A1 | 12/2018 |

OTHER PUBLICATIONS

Written Opinion issued in International Application No. PCT/EP2022/069357; Dated Sep. 30, 2022 (6 pages).
International Preliminary Report on Patentability issued in International Application No. PCT/EP2022/069357; mailed Jun. 30, 2023 (21 pages).

* cited by examiner

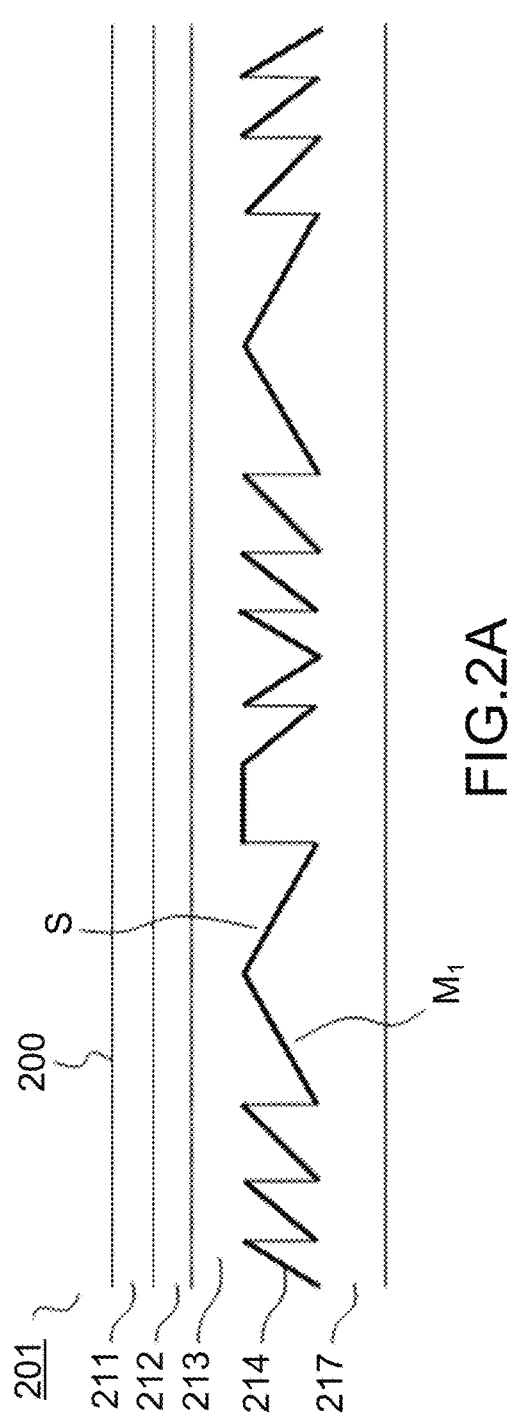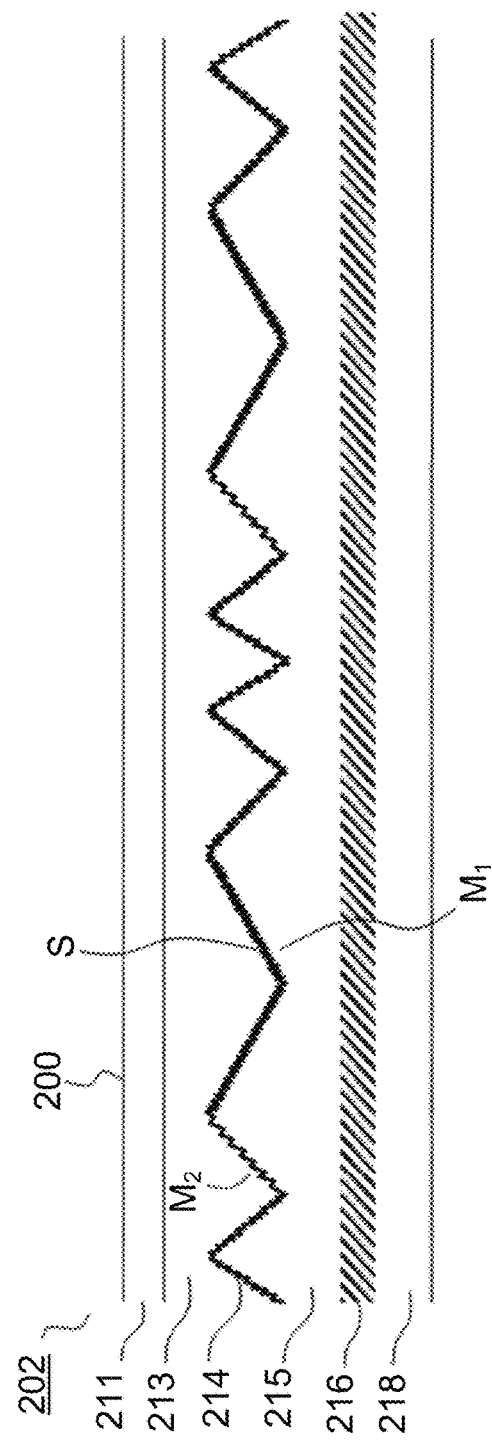

OPTICAL SECURITY COMPONENTS, MANUFACTURE OF SUCH COMPONENTS AND SECURE DOCUMENTS EQUIPPED WITH SUCH COMPONENTS

TECHNICAL FIELD OF THE INVENTION

The present description relates to the field of security marking. More particularly, it relates to optical security components for verifying the authenticity of a document in reflection, with the naked eye or using an optical checking device, to a method for manufacturing such a component and to a secure document equipped with such a document.

PRIOR ART

Many technologies are known for the authentication of documents or products, and in particular for securing documents such as valuable documents, documents such as bank notes, passports or other identification documents. The aim of these technologies is the production of optical security components having optical effects which, depending on the viewing parameters (orientation of the component relative to the viewing axis, position and dimensions of the light source, etc.), take on very characteristic and verifiable configurations.

The general goal of these optical components is to provide new and differentiated optical effects, based on physical configurations that are difficult to reproduce. Among such components, DOVID, which stands for "Diffractive Optically Variable Image Device", is the name given to optical components that produce diffractive variable images commonly known as holograms.

It is known practice for example to generate an effect consisting of a dynamic variation of an optical effect, for example in the form of movement in a given direction of a bright and/or colored zone, sometimes called a "rolling bar", the movement resulting from a rotation (tilting) of the component. An observer can thus see a bright and/or colored zone that moves along an image as they rotate the component, serving as an additional authentication check. Such dynamic optical effects presenting "rolling bars" are for example described in the application for published patent WO2015154943 [Ref. 1] in the name of the applicant. An optical security component described in the application cited above has a visible effect in reflection. The optical security component comprises a diffractive structure etched on a layer of dielectric material. The structure presents a first pattern comprising a bas-relief with a first set of facets the shapes of which are determined to simulate a series of concave or convex cylindrical optical elements, which are visible in reflection, this first pattern being modulated by a second pattern forming a sub-wavelength grating. Such an optical security component exhibits a dynamic visual effect of bright bands of different colors moving in opposite directions when it is rotated by tilting about an axis parallel to one of the main directions of the cylindrical elements. Dynamic visual effects that are more complex than those disclosed in [Ref. 1], such as for example the crossing of two line segments "moving" in the same direction at different speeds or in opposite directions, and/or the movement of an oblique line segment, are described in the application for published patent WO2018224512 [Ref. 2] in the name of the applicant.

Published patent application US2010/0182221 [Ref. 3] also describes an optical security component presenting in reflection another type of dynamic visual effect based on a Moiré type effect. FIG. 1 reproduces a figure from [Ref. 3] mentioned above showing a sectional view of a security element 10, in this case a transfer element for bank notes, comprising a transparent substrate 11, a two-dimensional arrangement 12 of micro-lenses, a pattern 16 arranged on one face of the substrate opposite the side facing the micro-lenses, said face of the substrate being coincident with a focal plane of the micro-lenses, the pattern 16 being subdivided into cells 14 each comprising a pattern element 18. Such an arrangement gives an observer an illusion of a pattern that floats above or below the plane of the micro-lenses. Further, dynamic effects are visible by tilting movements, by calculating the image elements 18 of the pattern 16.

Another optical security component presenting a dynamic visual effect in reflection based on a Moiré type magnification effect is described in the application for published patent US 20140367957 [Ref. 4]. Compared to [Ref. 3], such an optical security component is advantageous in that the arrangement on two separate parallel planes is replaced by a structured layer compatible with methods for manufacturing DOVID type components. FIG. 1B reproduces such an optical component. The optical component 20 shown in FIG. 1B comprises an arrangement of micro-lenses in which "slices" corresponding to imprints of identical micro-images reproduced periodically have been removed. Elements in relief 28 (FIG. 1B) characteristic of the micro-images are thus obtained. The elements in relief 28 comprise microstructures 27 formed of "segments" of micro-lenses which therefore have curved external surfaces which follow the profile of the micro-lenses. As shown in FIG. 1B, the curved external surfaces of the microstructures 27 reflect the incident light following the laws of reflection, in all directions (rays $R_1$), while the flat surfaces 26 between the microstructures 27 only reflect the incident light in specular reflection. From the vantage point of an observer, each element in relief 28 resulting from the structuring of a micro-lens according to the imprint of a corresponding micro-image, will present a visible point of light illustrated by the ray $R_2$ (ray in dotted lines reflected toward the observer) and corresponding to a portion of the micro-image magnified by the Moiré effect. As the optical component 20 is tilted, the points of light visible to the observer will come from other regions of the microstructures 27, thereby generating new images for the observer. Thus, the images obtained by Moiré magnification may exhibit, in addition to a magnification effect, dynamic visual effects of movement and other effects resulting from the specific characteristics of the micro-lenses, such as for example depth effects.

However, whether in the example described with reference to FIG. 1A or in the example described with reference to FIG. 1B, the desired Moiré effect requires a periodicity in the micro-image that is to appear moving to an observer. This constraint results in particular in a limitation on the size of the micro-image etched in the micro-lens which is of the order of the size of the micro-lens, something which requires special equipment to achieve good resolution in the formation of the images.

A similar limitation is found in the micro-optical system described in document EP 3 598 204 [Ref. 5] in which the object to be formed is reduced to a line. This example concerns a dynamic effect comprising movement of black and white stripes when the optical element is inclined upward/downward within a given inclination angle interval, while the observer does not see any effect of movement when the optical element is inclined to the right/left. More specifically, the micro-optical system described in [Ref. 5]

consists of a flat diffractive optical element with a domain Q in the form of a rectangle $|x|\leq Lx/2|y|\leq Ly/2$. The domain Q is subdivided into elementary areas $Q_{ij}$, each of a size smaller than or equal to 250 microns and centered on points $(x_i, y_j)$, $i=1 \ldots N$, $j=1 \ldots M$. For each area $Q_{ij}$, an optical element with a phase function $\Phi(x,y)$, which, at the point of each elementary area $Q_{ij}$, is defined by the formula $\Phi(x,y) = \phi_{ij}(x,y) \cdot \psi(y)$, $i=1 \ldots N$, $j=1 \ldots M$, is calculated and produced. The function $\phi_{ij}(x,y)$ has the form of the phase function of an off-axis Fresnel lens centered on the point $(x_i, y_j)$. The function $\psi(y)$ is a periodic extension of the function $\psi(y)$ defined over the interval $|y|\leq T\psi/2$ such that $\psi(y)$ is 1 if $|y|\leq\Delta/2$, and 0 if $|y|\geq\Delta/2$. The quantities $T\psi$ and $\Delta$ are specified parameters such that $\Delta/T\psi\leq\frac{1}{2}$, and the period $T\phi$ of the Fresnel lenses along the Oy axis, which is equal to $T\phi=Ly/M$, differs from the period $T\psi$ by no more than 5%. The difference between the arrangement period $T\phi$ of the Fresnel lenses and the period $T\psi$ of the mask which "cancels" the facets of the diffractive lenses in stripes of given width $\Delta$, creates the dynamic movement of shifting of black and white stripes during a tilting movement along the x axis parallel to the stripes generated by the mask, by a mechanism similar to that of a Moiré mechanism. However, the technique described is, like that described in [Ref. 3] or [Ref. 4], limited to an object defined in particular by the difference between the arrangement periods $T\phi$ of the Fresnel lenses and the period $T\psi$ of the mask.

The present application describes an optical security component with an original structure making it possible to achieve dynamic visual effects as described in [Ref. 3] or [Ref. 4] and in particular the appearance of graphical objects which seem to move above or below the plane of the component, but which are no longer based on Moiré type effects and which are thus free from the associated limitations.

SUMMARY OF THE INVENTION

In the present description, the term "comprise" means the same as "include" or "contain" and is inclusive or open and does not exclude other elements not described or shown. Further, in the present description, the term "approximately" or "substantially" means the same as "with a margin of less than and/or greater than 10%, for example 5%", of the respective value. According to a first aspect, the invention relates to an optical security component configured for authentication in reflection, from at least a first viewing face, the component comprising:

a first layer made of dielectric material, transparent in the visible;

at least a first diffractive structure etched on said first layer; and a second layer, covering said first diffractive structure at least partially, and having a spectral band of reflection in the visible; and wherein:

said first diffractive structure comprises at least a first pattern consisting of a set of facets arranged to form a plurality of subsets of facets, each subset of facets comprising one or more facets with symmetry of revolution arranged concentrically, said facet(s) of each subset of facets each having a slope with an angular value comprised, in absolute value, between a non-zero minimum angular value and a maximum angular value strictly less than 90°, said facet(s) of each subset of facets each having a given maximum height, a maximum lateral dimension of each subset of facets being smaller than approximately 300 μm;

in each group of a plurality of groups of subsets of facets, said subsets of facets each present, in a point region defined by an angular sector with polar coordinates comprising an angular coordinate and a radial coordinate which are identical for all subsets of facets of the group, a local alteration of the surface, such as to produce a recognizable graphical object for a given tilt angle and azimuth angle;

said polar coordinates vary from one group to another, in such a way as to produce, when the component is illuminated along a given lighting axis, a dynamic visual effect observable in reflection by a change of tilt and/or azimuth.

In the present description, a layer transparent in the visible is defined as a layer having a transmission of at least 70%, preferably at least 80% for a wavelength included in the visible, that is to say a wavelength between approximately 400 nm and approximately 800 nm. Such a transparent layer allows the layers located under the transparent layer to be seen with the naked eye.

In the present description, the "height" of a facet is a distance between a lowest level of the facet and a highest level, the distance being measured along an axis perpendicular to a plane parallel to the plane of the component.

The "width" of a facet is the width of the ring resulting from the projection of the facet in a plane parallel to the plane of the component.

According to one or more embodiments, all the facets have a substantially identical height. The height of the facets is for example less than approximately 2 microns, advantageously less than approximately 1 micron. According to one or more examples, the facets of the set of facets have different heights. In this case, however, the facets have a maximum height. Said maximum height is for example less than approximately 2 microns, advantageously less than approximately 1 micron.

According to one or more embodiments, all the facets have a lower level located in the same plane. In other embodiments, the lower levels of the facets are not in the same plane. In the case of facets of different heights, midpoints of the facets located between the lower level and the higher level may for example be in the same plane.

According to one or more examples, the widths of the facets are between approximately 2 μm and approximately 100 μm, advantageously between approximately 2 μm and approximately 80 μm, advantageously approximately 4 μm and approximately 80 μm.

According to one or more embodiments, said minimum angular value of the slope of a facet (in absolute value) is equal to approximately 1°. According to one or more embodiments, said maximum angular value of the slope of a facet (in absolute value) is equal to approximately 45°. According to one or more examples, the angular value of the slope of a facet (in absolute value) is between approximately 1° and approximately 30°, advantageously between approximately 2° and approximately 15°.

By convention, in the present description, the positive direction for measuring the angular values of the slopes of the facets is the clockwise (or anti-trigonometric) direction, the angle being measured between a plane parallel to the plane of the component and the surface of the facet.

In the present description, the term "point region" or "pixel" of a subset of facets means an angular sector of a facet of said subset of facets defined by its polar coordinates, namely a radial coordinate and an angular coordinate. The radial coordinate corresponds to the facet on which said point region is located and the angular coordinate corresponds to an average azimuth angle relative to a reference axis. Such a point region thus takes the form of an angular sector having two predetermined dimensions, namely a width equal to the width of the facet on which it is located and an arc length which depends on a predetermined resolution in azimuth sought for a movement in azimuth. Each subset of facets thus presents a finite predetermined number of point regions.

The applicant has shown that such an optical security component presents, in reflection and under the effect of a simple tilting and/or azimuthal movement, a dynamic visual effect including for example and in a non-limiting manner a movement (translation and/or rotation) and/or deformation of recognizable graphical objects, in which the graphical objects may moreover seem to appear above or below the plane of the component. This same effect of movement (translation and/or rotation) and/or deformation of recognizable graphical objects can be seen with the naked eye or by means of an authentication device comprising an optical imaging device. Such a dynamic effect results from the local breakdown of a light diffusion property linked to the local alteration of the surface at given point regions of subsets of facets. It is thus possible to achieve more complex visual effects than those obtained by the Moiré effect while being no longer constrained by the manufacture of the micro-image within a micro-lens.

Light diffusion results from the arrangement of facets in the form of a plurality of subsets of one or more concentric facets.

According to one or more embodiments, each subset of facets has a maximum dimension (diameter) of between 10 μm and 300 μm, preferably between 50 μm and 150 μm. By reducing the size of each subset of facets and minimizing the distance between two adjacent subsets of facets, the resolution of the graphical object is increased since the distance between two neighboring pixels is reduced. Thus, the distance between two adjacent subsets of facets defined center to center is advantageously less than a dimension equal to 1.3 times the dimension of a subset of facets and advantageously substantially equal to the dimension of a subset of facets.

According to one or more embodiments, the subsets of facets include only a single facet. A dynamic effect may be obtained by an azimuthal rotation movement by generating point regions different in azimuth. It is also possible to generate a "flip flop" effect of alternation between two recognizable graphical objects by partitioning the plane into two azimuthal regions.

According to one or more embodiments, each subset of facets comprises a plurality of facets, for example between 2 facets and approximately 150 facets, advantageously between 2 facets and approximately 50 facets, advantageously between 3 and approximately 50 facets, advantageously between 5 and approximately 50 facets, for example between 5 and 10 facets. With a plurality of facets per subset of facets, a dynamic effect may be obtained by both a tilting and an azimuthal movement.

To generate a dynamic animation, a plurality of groups of subsets of facets is defined, for example between 2 and approximately 1000 groups of subsets of facets, advantageously between 50 and 300 groups of subsets of facets. In each group of subsets of facets, a local alteration of the surface in point regions of identical polar coordinates of the subsets of facets produces a recognizable graphical object for a tilt angle and an azimuth angle defined by said polar coordinates owing to the breakdown of the diffusion property according to this tilt angle and this azimuth angle. Thus, by varying for each group the polar coordinates of the point regions which have the local alteration of the surface it is possible to produce, when the component is illuminated with white light along a given lighting axis, a dynamic visual effect observable in reflection by a change of tilt and/or azimuth.

According to one or more embodiments, at least the angular coordinate varies from one group to another, in such a way as to produce, when the component is illuminated along a given lighting axis, a dynamic visual effect observable in reflection by a change of azimuth. Azimuth resolution is given by the number of point regions or angular sectors of each facet. With greater azimuthal resolution, greater continuity in azimuthal movement will be observed. The number of point regions per facet is for example between 2 and 360. With a greater number of facets per subset of facets, for example at least 5 facets with symmetry of revolution arranged concentrically per subset of facets, greater continuity in the tilting movement will be observed.

The optical security component thus described allows more secure authentication and a stronger technological barrier, owing to the flexibility of design of the component to obtain the effect described above, and also has the advantage of only resulting from the structuring of a single layer.

According to one or more embodiments, the arrangement of the facets in the subsets of facets is identical.

However, in practice, the arrangement of the facets in all the subsets of facets may be non-identical, the technical effect remaining substantially the same, as long as the slopes of the facets which have a local alteration of the surface in the subsets of facets are in the same slope range. It is for example possible to provide subsets of facets comprising facets with slopes greater than the slopes of the facets which have a local alteration of the surface, in order to create additional visual effects which are only apparent for much larger tilt angles and which can thus constitute an additional authentication.

According to one or more embodiments, each subset of facets comprises a plurality of facets arranged concentrically and the arrangement of the facets in at least part of the subset of facets is such that the facets are arranged with variable slopes the variation of which increases, respectively decreases, in absolute value from the center of the subset of facets toward the edge of the subset of facets, the subset of facets forming a "Fresnel lens" type structure. Each Fresnel lens has a diameter of less than 300 μm such that it is not visible to the naked eye. The arrangement of a plurality of Fresnel lenses next to one another in a plane parallel to the plane of the component makes it possible to generate diffusion lobes centered on viewing angles which depend on the slopes of the facets.

According to one or more embodiments, the arrangement of the facets concentrically in at least part of the subset of facets is such that the facets are arranged with alternately positive and negative variable slopes, the variation of which increases, respectively decreases, in absolute value from the center of the subset of facets toward the edge of the subset of facets, the subset of facets forming a structure which will be referred to as an "axicon" in the present description. Each axicon has a diameter of less than 300 μm such that it is not visible to the naked eye. The arrangement of a plurality of axicons next to one another in a plane parallel to the plane of the component makes it possible to generate diffusion lobes centered on viewing angles which depend on the slopes of the facets.

Whatever the type of arrangement of the facets within the subset of facets, it will be sought, according to preferred embodiments, to reduce as much as possible the distance between two neighboring subsets of facets so as to increase the resolution of the graphical objects generated.

According to one or more embodiments, a number of subsets of facets is between 5 subsets of facets, for example for authentication with an optical device, and approximately 100,000 subsets of facets, which corresponds for example to a diffractive structure with a surface area of 70 cm$^2$ made up of subsets with a diameter of 70 µm. In practice, in other embodiments, a number of subsets of facets is between approximately 300 and approximately 40,000. This number is for example suitable for subsets of facets with a diameter between 70 µm and 200 µm, to make a diffractive structure the surface of which is between approximately 200 mm$^2$ and approximately 800 mm$^2$, which corresponds for example to surface areas of security threads or patches.

According to one or more embodiments, the subsets of facets are arranged in a regular arrangement with a hexagonal grid, which makes it possible to maximize the number of sub-facets over a given surface. Other grids are possible, for example a square grid.

According to one or more embodiments, said local alteration of the surface comprises a substantially zero local slope of the facet at said point region. This break in the slope of the facet produces a local change in the direction of reflection which results in a strongly contrasting point (for example black on a white background) in the direction of viewing defined in tilt and azimuth by the polar coordinates of the point regions for which the surface is altered. By introducing this break in slope for point regions with the same polar coordinates of a group of given subsets of facets such that they form a recognizable graphical object, an object with high contrast in said direction of viewing is created. This same break in slope may then be produced for another point region of another group of subsets of facets such that this other group forms a recognizable graphical object, identical or non-identical, to give the impression of an object which moves when the tilt and/or azimuth is changed and/or which is deformed if the graphical object is modified.

According to one or more embodiments, the second layer comprises a metal material. The metal material comprises one of the materials or an alloy of materials selected from: Aluminum (Al), Silver (Ag), Chrome (Cr), Gold (Au), Copper (Cu). For example, a thickness of the layer of metal material is greater than approximately 2 to 3 times the skin depth of the metal or alloy from which it is formed in the visible frequency range; for example, a thickness of the layer of metal material is between approximately 20 nm and approximately 60 nm for aluminum.

According to one or more embodiments, the dielectric material of the first layer has a first refractive index and the second layer comprises a dielectric material having a second refractive index such that the difference between the second refractive index and the first refractive index is greater than or equal to approximately 0.3, advantageously greater than or equal to approximately 0.5. For example, said second layer comprises a material selected from: zinc sulfide (ZnS), titanium dioxide (TiO$_2$) or silicon nitride (Si$_3$N$_4$).

According to one or more embodiments, the second layer comprises a stack of layers capable of producing an interference filter, for example a stack of materials of low and high refractive index, for example a stack as described in patent application WO2001003945 [Ref. 6]. For example, such a stack may include a material with a refractive index of 1.5 Al (5 nm)/ZnS (65 nm)/Al (30 nm).

In general, the material from which the second layer is formed makes it possible to give the component a spectral band of reflection in the visible and to make said first diffractive structure visible. Such materials suitable for said second layer are described for example in U.S. Pat. No. 4,856,857 [Ref. 7].

According to one or more embodiments, in at least a first region, said first pattern is modulated by a second pattern forming a zero-order diffraction grating. More specifically, the first diffraction grating is a one-dimensional or two-dimensional periodic grating, with a period of between 150 nm and 500 nm, advantageously between 200 nm and 400 nm, and which behaves in the visible like a "sub-wavelength" grating, that is to say with a period less than the smallest wavelength used to view the component. The grating is determined to produce, after deposition of the second reflective layer, a filter resonant in a spectral band determined in particular according to the characteristics of the grating.

Thus, according to a first embodiment, the sub-wavelength diffraction grating is configured to produce a wavelength subtractive filter, referred to as a "dielectric subtractive resonant filter" in the remainder of the description. An example of such a filter is for example the DID™ (for "Diffractive Identification Device"), manufactured by the applicant. In this first embodiment, the second reflective layer is a layer of transparent dielectric material, and the one-dimensional sub-wavelength diffraction grating is configured to allow the excitation of guided modes within the transparent reflective layer, forming a resonant band-pass filter in reflection, the resonance spectral band of which is centered on a wavelength determined according to the characteristics of the grating and the nature of the layers. The transparent reflective layer comprises a thin layer, with a thickness preferably between 20 nm and 200 nm and preferably between 60 nm and 150 nm, and has a second refractive index which differs from the refractive index of the neighboring layers by at least 0.3, advantageously by at least 0.5. According to one or more embodiments, said thin layer of dielectric material is a layer of "High Refractive Index" (HRI) material, having a refractive index of between 1.8 and 2.9, advantageously between 2.0 and 2.4, and the neighboring layers are "low refractive index" layers, having refractive indices of between 1.3 and 1.8, advantageously between 1.4 and 1.7. Such a dielectric subtractive resonant filter is described for example in patent FR2509873B1 [Ref. 8].

In operation, the effect of such a dielectric subtractive resonant filter is superimposed on the effect of the subsets of concentric facets to produce a colored effect in the direction of viewing.

According to another embodiment, the sub-wavelength diffraction grating is configured to produce a resonant band-stop filter in reflection. This is a reflection plasmonic filter, referred to as "R'plasmon" in the present description, and as described for example in patent application EP2771724 [Ref. 9] or in patent application EP3099513 [Ref. 10]. To this end, the second reflective layer is metal and comprises a thin layer of metal material, for example silver or aluminum, advantageously with a thickness greater than 40 nm. Advantageously, the metal reflective layer is sufficiently thick to have a maximum residual transmission as a function of the wavelength of 2%.

In operation, the effect of such a R'Plasmon plasmonic filter is superimposed on the effect of the subsets of concentric facets to produce a colored effect in the direction of viewing.

In the case of a first pattern modulated by a second pattern, a width of the facets is advantageously greater than or equal to approximately 4 times, advantageously greater than or equal to approximately 8 times said grating period. The minimum dimension may therefore be selected as a function of the period of the grating. For example, a minimum dimension of the width of the facets is equal to approximately 2 μm.

In the case of a first pattern modulated by a second pattern, said local alteration of the surface may comprise a local modification of a property of said periodic grating, for example a property chosen from the profile, the azimuth (orientation of the grating vector), the depth and the period of the grating or the local absence of said grating.

According to one or more embodiments, in the case of a first pattern not modulated by a second pattern, said local alteration of the surface may comprise a local modulation of the first pattern by a second pattern forming a periodic grating, of predetermined period included between 150 nm and 500 nm, said grating being determined so as to produce, after deposition of the second layer, a resonant effect. For example, a grating is in accordance with those described above to produce a DID™ or R'Plasmon type effect.

According to one or more embodiments, the optical security component according to the first aspect comprises at least a second structure etched on said first layer, said second layer covering said second structure at least partially. The second structure is configured to form, by way of non-limiting example, a diffusing structure, a holographic structure, a diffracting structure making it possible to produce for example an effect referred to as Alphagram®, developed by the applicant.

According to one or more embodiments, the optical security component according to the first aspect comprises one or more additional layers depending on the requirements for use, without this or these additional layers contributing to the desired visual effect.

Thus, according to one or more embodiments, the optical security component is configured to secure an object, for example a document or a product, and further comprises, on the face opposite the viewing face, a layer adapted for transferring the component to the document or product, for example an adhesive layer or a layer of reactivatable adhesive.

According to one or more embodiments, the optical security component further comprises, on the side of the first viewing face, a support film intended to be detached after transfer of the component to the document or product.

According to one or more embodiments, the optical security component is configured for the manufacture of a security track for securing bank notes, and comprises on the side of the first viewing face and/or on the face opposite the first viewing face, one or more layers of protection.

According to a second aspect, the present description relates to a secure object, for example a secure valuable document, comprising a substrate and an optical security component according to the first aspect, deposited on said substrate or on one of the layers of said substrate in the case of a multilayer substrate.

Such a secure object is, by way of non-limiting example: a bank note, or an identity or travel document, on a paper or polymer substrate.

According to a third aspect, the present description relates to methods for manufacturing optical security components according to the first aspect.

Thus, the present description relates to a method for manufacturing an optical security component intended to be viewed in reflection from a viewing face, the method comprising:
depositing, on a support film, a first layer made of dielectric material, transparent in the visible;
forming, on said first layer, at least a first diffractive structure,
depositing a second layer, covering said first diffractive structure at least partially, and having a spectral band of reflection in the visible, wherein:
said first diffractive structure comprises at least a first pattern consisting of a set of facets arranged to form a plurality of subsets of facets, each subset of facets comprising one or more facets with symmetry of revolution arranged concentrically, said facet(s) of each subset of facets each having a slope with an angular value comprised, in absolute value, between a non-zero minimum angular value and a maximum angular value strictly less than 90°, said facet(s) of each subset of facets each having a given maximum height, a maximum lateral dimension of each subset of facets being smaller than approximately 300 μm;
in each group of a plurality of groups of subsets of facets, said subsets of facets each present, in a point region defined by an angular sector with polar coordinates comprising an angular coordinate and a radial coordinate which are identical for all subsets of facets of the group, a local alteration of the surface, such as to produce a recognizable graphical object for a given tilt angle and azimuth angle;
said polar coordinates vary from one group to another, in such a way as to produce, when the component is illuminated along a given lighting axis, a dynamic visual effect observable in reflection by a change of tilt and/or azimuth.

According to a fourth aspect, the present description relates to a method for authenticating with the naked eye a secure object according to the second aspect, the authentication method comprising:
viewing the optical security component of said secure object along a viewing axis forming a given viewing angle with the lighting axis;
a tilting and/or azimuthal movement of said secure object resulting in a dynamic visual effect comprising a movement of graphical objects, said graphical objects being recognizable to the naked eye.

In naked eye authentication of the optical security component of a secure object, the change of tilt and/or azimuth may include a tilting movement of the component, that is to say a rotation of the component about an axis contained in the plane of the component and/or an azimuthal movement of the component, that is to say a rotation about an axis perpendicular to the plane of the component, while viewing is along a given viewing axis.

The viewing angle is for example defined in relation to a vertical lighting direction.

According to one or more embodiments, the viewing angle is between approximately 300 and approximately 60°. For example, the viewing angle is equal to approximately 45°, which corresponds, for vertical lighting, to a conventional viewing direction for an observer during naked eye authentication.

For viewing of a graphical object with the naked eye, at least one graphical object formed by at least one of the groups of subsets of facets has a minimum dimension greater than 500 µm, preferably greater than 1 mm, preferably greater than 2 mm, preferably greater than 5 mm. Such a minimum dimension makes it possible to generate a graphical object recognizable to the naked eye.

According to a fifth aspect, the present description relates to a method for authenticating a secure object according to the second aspect by means of an optical imaging device comprising an optical imaging axis, said authentication method comprising:

- forming an image of said optical security component, by means of the optical imaging device, said optical imaging axis forming a given viewing angle with the lighting axis;
- a tilting and/or azimuthal movement of said secure object or a tilting and/or azimuthal movement of said optical imaging axis resulting in a dynamic visual effect comprising a movement of graphical objects, said graphical objects being recognizable to said optical imaging device.

Thus, in authentication by means of an authentication device comprising an optical imaging device, for example a camera of a smartphone-type device, the change in tilt and/or azimuth may include a tilting or azimuthal movement of the authentication device itself, that is to say respectively about an axis located in a plane of the component or about an axis perpendicular to the plane of the component.

According to one or more embodiments, the lighting axis and the optical imaging axis are substantially the same, the light source being included in the authentication device.

For viewing of a graphical object by means of an optical imaging device, at least one graphical object may consist of a non-figurative graphical object, for example a QR code. Further, due to the possible enlargement of the optical imaging device, the dimensions of the graphical objects formed by the groups of subsets of facets may have dimensions smaller than the dimensions required for perception by eye.

BRIEF DESCRIPTION OF THE FIGURES

Further features and advantages of the invention will emerge on reading the description below, illustrated by the following figures:

FIG. 2A schematically depicts a (partial) sectional view of an embodiment of a component according to the present description.

FIG. 2B schematically depicts a (partial) sectional view of another embodiment of a component according to the present description.

DETAILED DESCRIPTION

Figure 1A:
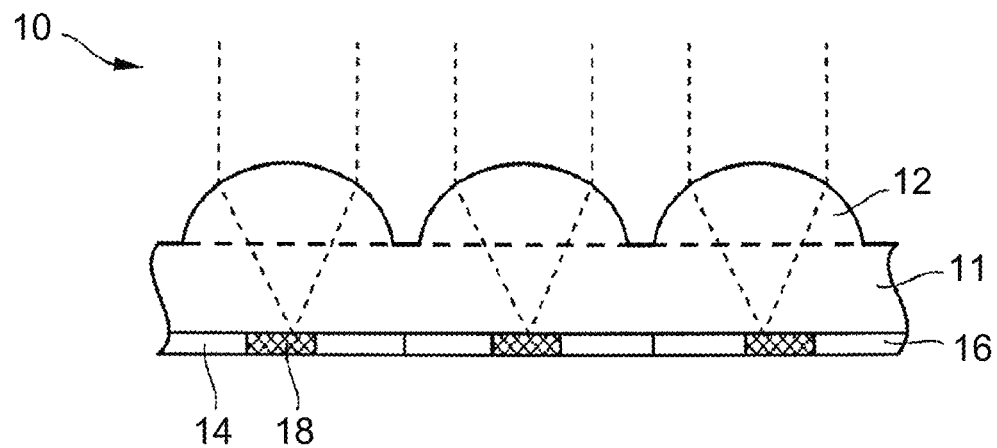
FIG. 1A (already discussed) shows an example of a security element described in [Ref. 3] of the prior art.
Figure 1B:
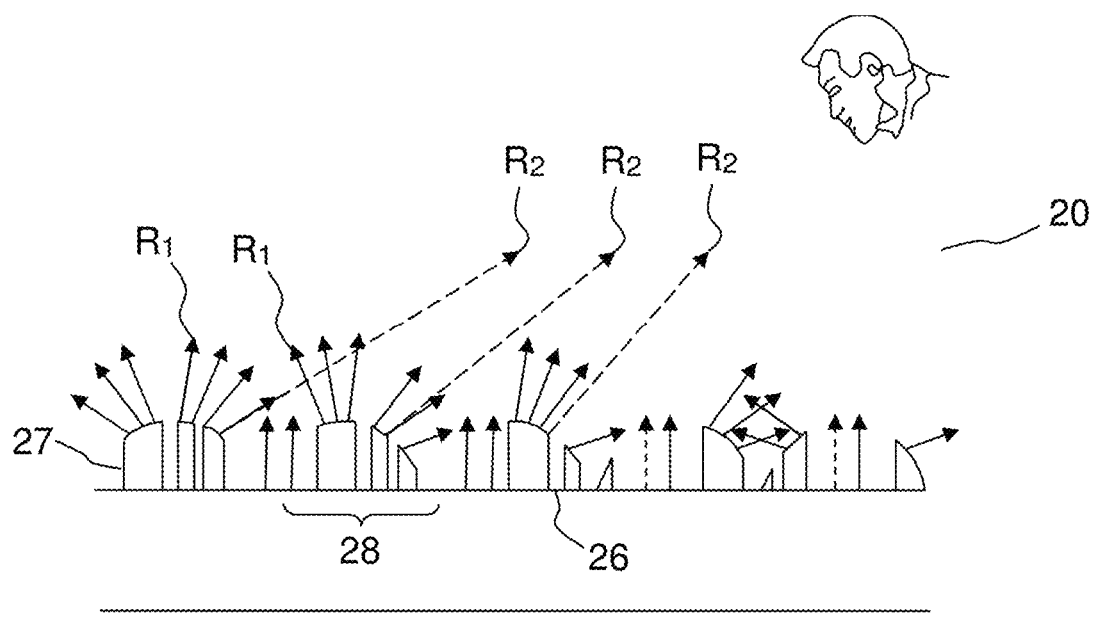
FIG. 1B (already discussed) shows an example of a security element described in [Ref. 4] of the prior art.

In the figures, the elements are not shown to scale for better visibility.

FIG. 2A and FIG. 2B show, schematically and in (partial) sectional views, two examples of optical security components according to the present description. The optical security component 201 shown in FIG. 2A represents for example an optical security component intended to be transferred to a document or a product with a view to securing same. According to this example, it comprises a support film 211, for example a film made of polymer material, for example a polyethylene terephthalate (PET) film of a few tens of micrometers, typically 15 to 100 µm, and a detachment layer 212, for example made of natural or synthetic wax. The detachment layer makes it possible to remove the polymer support film 211 after transfer of the optical component to the product or document to be secured. The optical security component 201 further comprises a first layer 213 made of dielectric material, having a first refractive index $n_1$, and at least a first diffractive structure S, comprising a first pattern $M_1$ stamped on said first layer 213, as will be described in more detail below.

In the example of FIG. 2A, the optical security component 201 also comprises a second layer 214, which is reflective, covering said first structure S at least partially, and having a spectral band of reflection in the visible. The second layer 214 is for example a metal layer or a layer referred to as an index variation layer having a refractive index different from that of the first layer 213, the difference in index between the layers 213 and 214 having a value at least equal to 0.3, advantageously a value at least equal to 0.5. The layer 214 ensures the reflection of incident light.

The optical security component also comprises one or more optional layers, not optically functional but adapted to the usage requirements.

For example, in the example of FIG. 2A, the optical security component further comprises a layer of adhesive 217, for example a layer of heat-reactivable adhesive, for transferring the optical security component to the product or document.

In practice, as will be described in detail below, the optical security component may be manufactured by stacking the layers on the support film 211, then the component is transferred to a document/product to be secured using the adhesive layer 217. Optionally, the support film 211 may then be detached, for example by means of the detachment layer 212. The main viewing face 200 of the optical security component is thus located on the side of the first layer 213 opposite the structured face of the layer 213.

The optical security component 202 shown in FIG. 2B represents for example an optical security component intended for securing bank notes; this is for example part of a security thread intended to be integrated into the paper during the manufacture of the note or a laminated track covering a window in the paper, or a patch. In this example, the component 202 comprises, as previously, a support film 211 (12 to 50 μm) which will also serve as a protective film for the security thread, and, as in the example in FIG. 2A, a first layer 213 made of dielectric material having a first refractive index $n_1$, at least a first diffractive structure S, comprising a first pattern $M_1$, modulated by a second pattern $M_2$, for example a sub-wavelength diffractive grating, stamped on said first layer 213, as will be described in more detail below. A second layer 214 covers said first structure S at least partially, and has a spectral band of reflection in the visible. The optical security component 202 also comprises, in the example of FIG. 2B, a set of optional layers 215, 216, 218. The layer 215 (optional) is for example a layer made of dielectric material, for example a transparent layer or an opaque colored layer for increasing contrast; the layer 216 (optional) is for example a security layer, for example a discontinuous layer with a specific pattern printed locally with UV ink to produce additional marking that may be checked by eye or by machine; and the layer 218 (optional) is for example a protective layer, for example a second polymer film or a lacquer. In the case of a laminated track, the layer 218 may be an adhesive layer. As in the previous example, manufacturing may be carried out by stacking the layers on the support film 211. The dielectric layer 215 and the security layer 216 may form just one layer. The protective layer (or adhesive layer) 218 and the layer 215 may also form one and the same layer. It will be apparent to those skilled in the art that other optically non-functional layers may be added depending on the usage requirements in each of the examples shown in FIGS. 2A and 2B and that the alternative embodiments presented in FIGS. 2A and 2B may be combined. Note that if the additional layers, which are optically non-functional, for example the layer 217, or the layers 215, 216, 218, are transparent, along with the destination support, the optical security component may be visible from both sides, with an inversion of the curvatures of the optical elements generated.

Figure 3A:
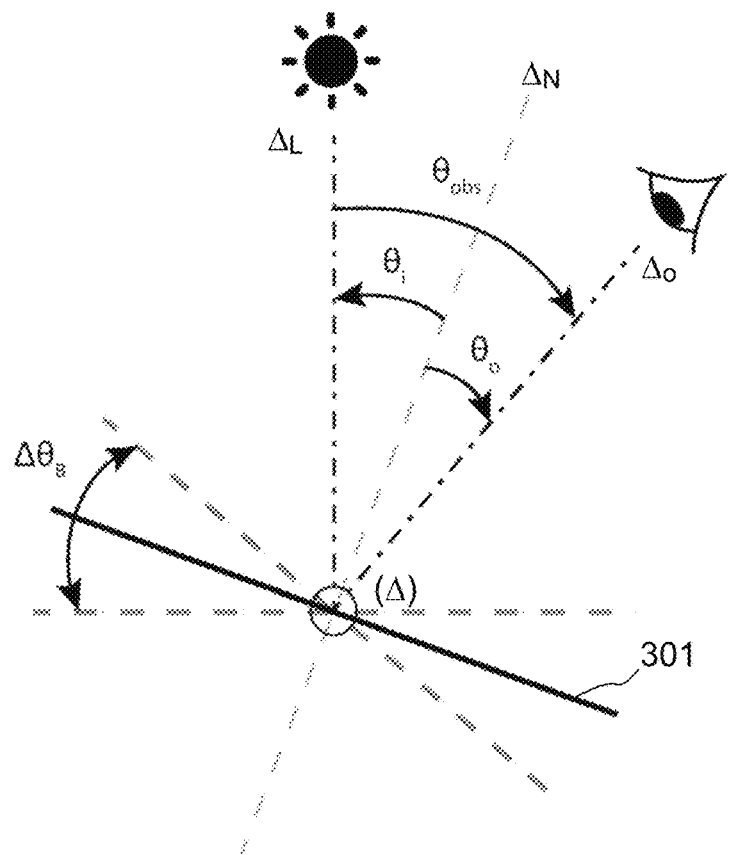
FIG. 3A shows the viewing parameters (tilt) of an optical security component according to the present description, in an example of viewing with the naked eye.

FIG. 3A shows the viewing parameters of an optical security component 301 according to the present description, in an example of viewing with the naked eye.

The lighting axis, for example vertical lighting corresponding to natural light, is designated $\Delta_L$ and the viewing axis, corresponding to the direction of viewing by an observer (symbolized by an eye in FIG. 3A), is designated $\Delta_O$, while the viewing angle between the axes $\Delta_L$ and $\Delta_O$ is designated $\theta_{obs}$. In the rest of the description, $\theta_{obs}$ is equated to the absolute value of the angular measurement of the viewing angle.

In practice, when checking the authenticity of a document secured by means of an optical security component according to the present description, the document is rotated (tilted) about a tilt axis $\Delta$ contained in the plane of the component and/or undergoes an azimuthal rotation about the axis $\Delta_N$ perpendicular to the plane of the component.

During authentication with the naked eye, the directions of lighting and viewing are fixed and the tilting and azimuthal movements of the component result in a variation in the angle of incidence $\theta i$ of the light incident on the component, defined in relation to an axis $\Delta_N$ normal to the plane of the component, as well as a variation in the azimuth angle. By convention, in the present description, the positive direction of the angle of incidence is the trigonometric direction.

Figure 3B:
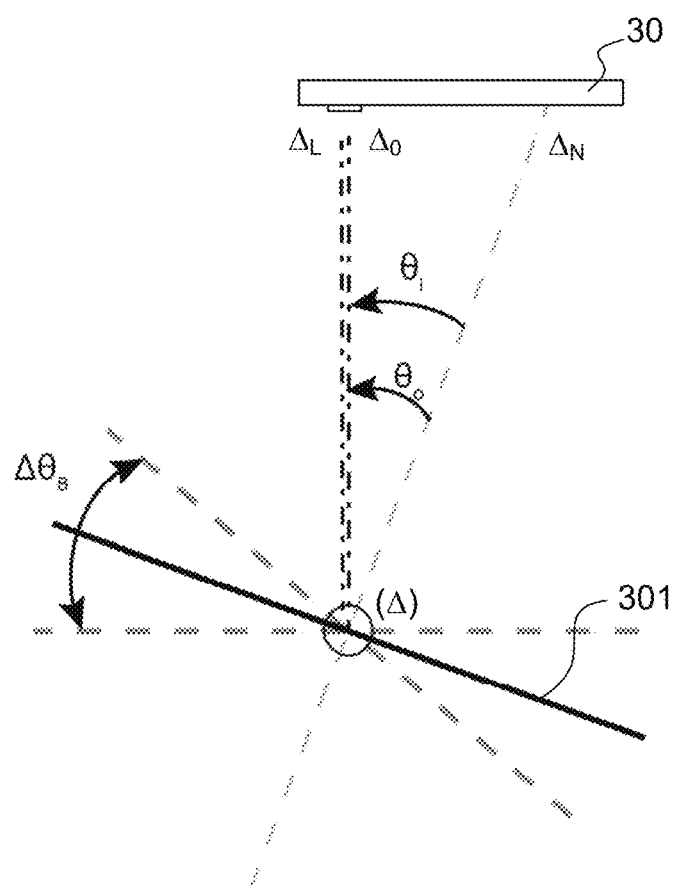
FIG. 3B shows the viewing parameters (tilt) of an optical security component according to the present description, in an example of viewing using an authentication device comprising an optical imaging device, for example a smartphone-type authentication device.

FIG. 3B shows the viewing parameters of an optical security component according to the present description, in an example of viewing using an optical imaging device 30, for example a camera of a smartphone-type authentication device.

In this example, the lighting axis $\Delta_L$ is substantially coincident with the viewing axis $\Delta_O$ which is the optical axis of the imaging device.

In practice, when checking the authenticity of a document secured by means of an optical security component according to the present description, either the component 301 is rotated (tilted) about a tilt axis $\Delta$ contained in the plane of the component or undergoes an azimuthal rotation about the axis $\Delta_N$ perpendicular to the plane of the component, or the optical imaging device is moved in tilt and in azimuth.

During authentication, the lighting and viewing directions remain coincident and the tilting and azimuthal movements of the authentication device result in a variation in the angle of incidence $\theta i$ of the light incident on the component, defined in relation to an axis $\Delta_N$ normal to the plane of the component, as well as a variation in the azimuth angle.

Figure 3C:
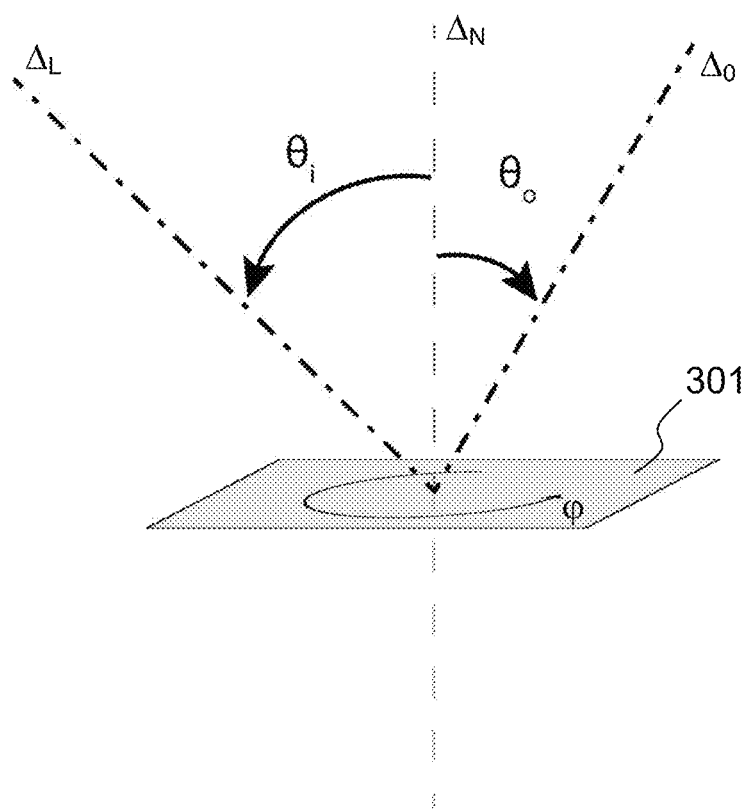
FIG. 3C shows the viewing parameters (azimuth) of an optical security component according to the present description.

FIG. 3C shows the viewing parameters of an optical security component 301 according to the present description. As shown in this figure, an optical component according to the present description is viewed not only in tilt (FIG. 3A and FIG. 3B) but also in azimuth. The azimuth angle, measured relative to an arbitrary axis, is denoted φ.

Figure 4A:
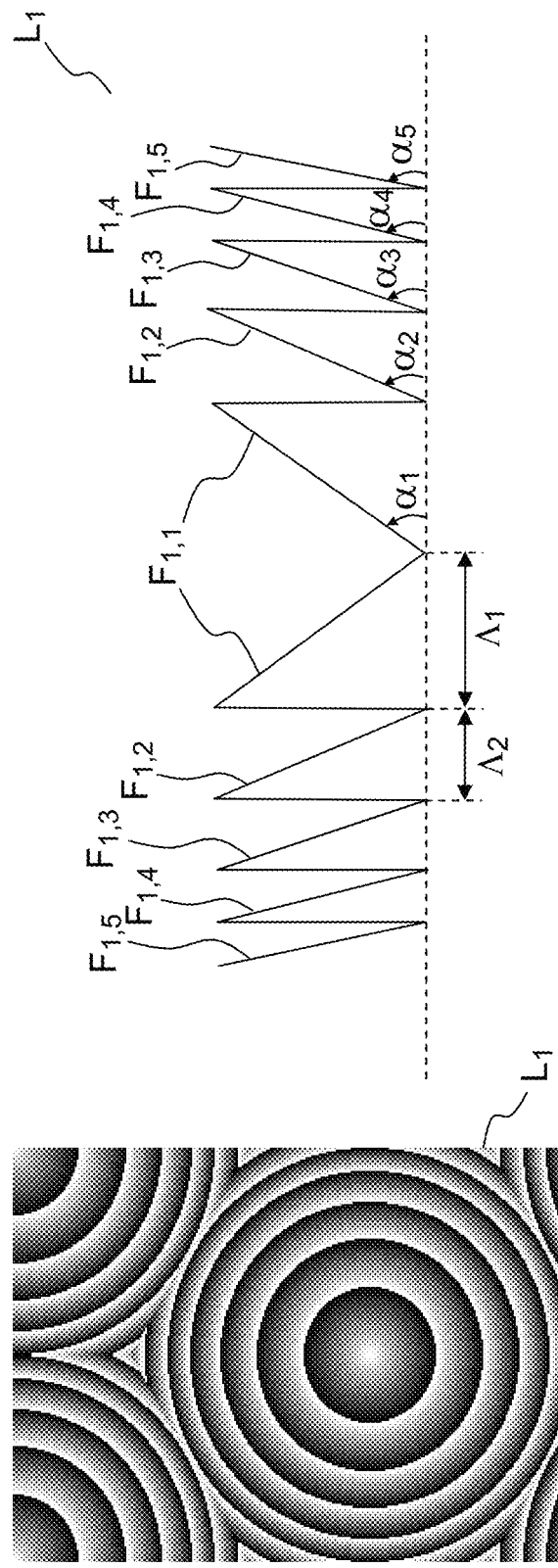
FIG. 4A schematically depicts a top view and a sectional view of an example of a subset of 5 concentric facets of "Fresnel lens" type.

FIG. 4A schematically depicts a top view and a sectional view of an example of a subset $L_1$ of 5 concentric facets $F_{1,1}$, $F_{1,2}$, $F_{1,3}$, $F_{1,4}$, $F_{1,5}$, of "Fresnel lens" type.

As can be seen in FIG. 4A, the facets of the subsets of facets are separated by substantially vertical walls. These vertical walls can introduce shading and therefore energy losses, thus subsets of facets of axicon type as described in relation to FIG. 4B are generally preferred.

Figure 4B:
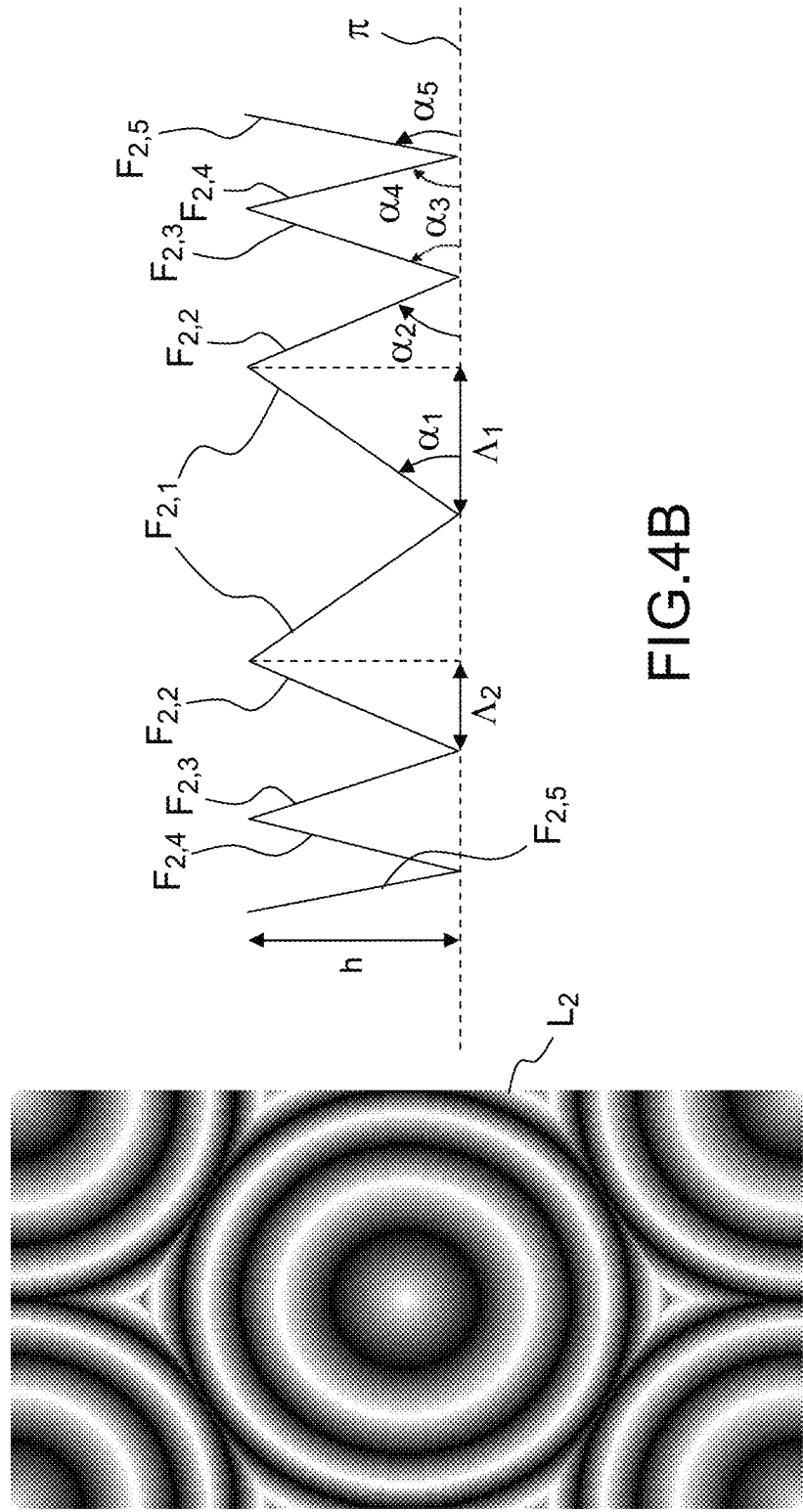
FIG. 4B schematically depicts a top view and a sectional view of an example of a subset of 5 concentric facets of "axicon" type.

FIG. 4B schematically depicts a top view and a sectional view of an example of a subset $L_2$ of 5 concentric facets $F_{2,1}$, $F_{2,2}$, $F_{2,3}$, $F_{2,4}$, $F_{2,5}$, of "axicon" type.

All the facets are concentric. They are characterized by a height h, defined by the distance between a lowest level of the facet and a highest level, the distance being measured along an axis perpendicular to the plane parallel to the plane of the component. In the examples of FIG. 4A and FIG. 4B, the lower levels of the facets are in the same plane π parallel to the plane of the component, but other configurations are possible. Further, in these examples, the facets all have the same height h, said height being less than approximately 2 µm, advantageously less than approximately 1 µm, for example between approximately 0.5 µm and approximately 1 µm.

The facets are also characterized by a width $\Lambda_i$, defined by the dimension of the facet in the slope variation direction, projected in a plane parallel to the plane of the component. The width is generally for example between approximately 2 µm and approximately 100 µm, for example between approximately 2 µm and approximately 80 µm, for example approximately 4 µm and approximately 40 µm.

The facets have slopes the angular values $\alpha_i$ of which are comprised, in absolute value, between a minimum angular value, for example 1°, and a maximum angular value, for example 45°. For example, the angular values $\alpha_i$ are between approximately 2° and approximately 15°.

In other embodiments, to obtain angular values of the slopes of the facets which are identical, it is possible to have different facet heights and identical widths.

The pattern $M_1$ comprises a plurality of subsets of facets, for example between a few hundred and a few tens of thousands of subsets of facets, for example subsets of facets of Fresnel lens or axicon type, as described above.

In some embodiments, the arrangement of the facets in the subsets of facets is identical. However, the arrangement of the facets in the subsets of facets may be non-identical, without this having any bearing on the technical effect.

Each subset of facets has a maximum dimension (diameter) of between 10 µm and 300 µm, preferably between 50 µm and 150 µm.

Further, each subset of facets may include only a single facet. To generate graphical objects with a better resolution, preference will be given to a plurality of facets per subset of facets, for example subsets of facets consisting of a number of facets of between 5 and approximately 50, advantageously between 5 and 10.

In the examples in FIG. 4A and FIG. 4B, the arrangement of the subsets of facets is hexagonal, which makes it possible to maximize the surface covered by the subsets of facets. Other arrangements are possible, for example an arrangement with a square grid.

Such a structure allows light to be diffused in diffusion lobes which depend on the slope, as described below.

Figure 5A:
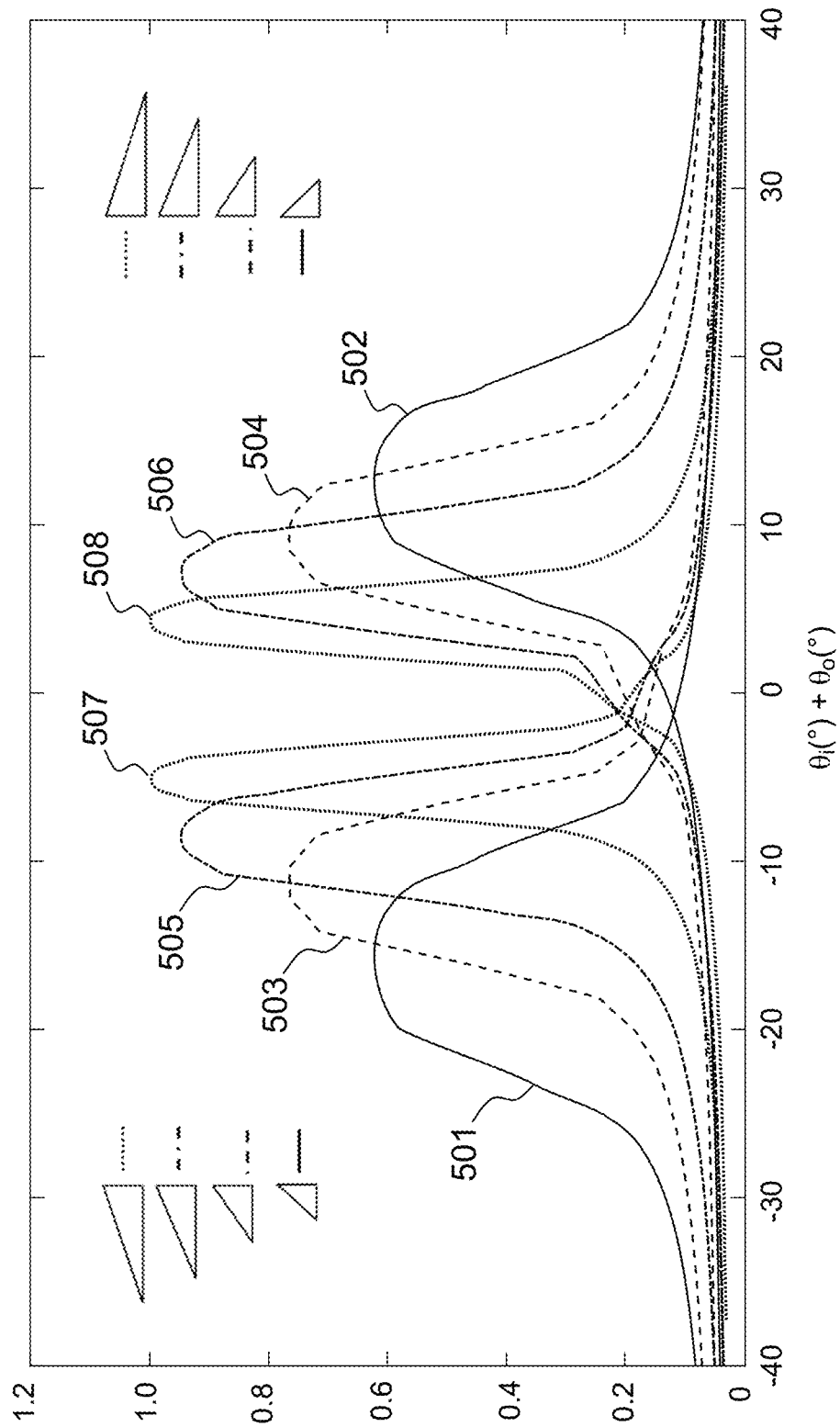
FIG. 5A shows the light intensity distribution as a function of the viewing angle for facets with different angles.

FIG. 5A shows the light intensity distribution as a function of the viewing angle, and more specifically as a function of $\theta_0+\theta_i$. Thus, $\theta_0+\theta_i=0$ corresponds to angles of incidence and viewing of opposite measurements, that is to say viewing under conditions of specular reflection. In the present description, specular reflection corresponds to the position of the component that allows reflection of the incident light with a reflection angle having a measurement opposite to that of the incident angle. In other words, the normal to the plane of the component splits the viewing angle into two angular sectors of equal measurement. As the facets have symmetry of revolution, whatever the azimuth, the optical response of a facet of width $\Delta\phi(y)$ and of depth h is obtained by calculating the Fourier transform FT of the phase shift $\Delta\phi(y)$ experienced by a light ray incident at a given position y of the facet with an angle $\theta_i$. The phase shift $\Delta\phi(y)$ is expressed as follows:

$$\Delta\phi(y) = \exp\left(\frac{4\pi n_1 j}{\lambda} h \cdot \frac{y}{\Lambda}\right); y \in [0, \Lambda] \quad \text{[Math 1]}$$

where λ is a central working length of the light source, for example 550 nm in the visible, $n_1$ is the index of the first layer of dielectric material (213, FIG. 2A and FIG. 2B), and h is the height of the facets. The optical response of the facet is thus expressed as follows:

$$TF(v) = \int_0^\Lambda \Delta\phi e^{-i2\pi vy} dy \quad \text{[Math 2]}$$

where v is the spatial frequency given by:

$$v = \frac{2\pi n_1}{\lambda} \sin(\theta_i). \quad \text{[Math 3]}$$

By virtue of this formalism, it is possible to predict the distribution of light energy for each facet as a function of $\theta_0+\theta_i$. In other words, for a given angle $\theta_i$, it will be possible to predict which facets reflect the light in a viewing direction defined by a given viewing angle $\theta_0$. In white light for example, the optical response of the facets of slope $\alpha_i$ corresponds to a diffraction lobe obtained considering the envelope of the range of orders diffracted for wavelengths ranging from 400 nm to 800 nm. The diffraction lobe of a facet of slope angle $\alpha_i$ is centered on the angular position $\theta_o=-\theta_i+2.\alpha_i$.

Examples of diffraction lobes 501, 502, 503, 504, 505, 505, 506, 507, 508 are shown in FIG. 5A. They correspond respectively to the light energy reflected by facets of widths [8.4 µm, 11.2 µm, 14.7 µm, 24.5 µm] for a height of 1 µm.

As can be seen, the facets which are slightly inclined reflect the light energy in a direction close to specular reflection (lobes 507, 508). Conversely, the more inclined facets reflect the light energy in a direction moving away from specular reflection (lobes 501, 502). It also appears that with a plurality of facets having different angles in the same subset of facets, the light is reflected in a large part of the space corresponding to all of the lobes, which helps generate a very broad diffusion lobe within which a graphical object can be produced by locally altering the surface of facets within the subsets of facets.

Figure 5B:
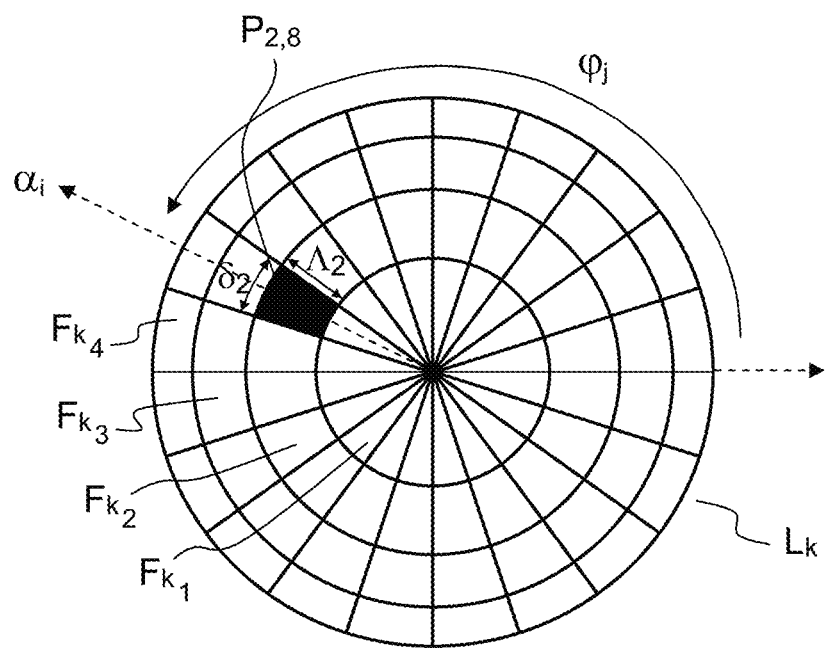
FIG. 5B schematically depicts the point regions or pixels in a subset comprising 4 facets, for 20 average azimuth values.
Figure 5C:
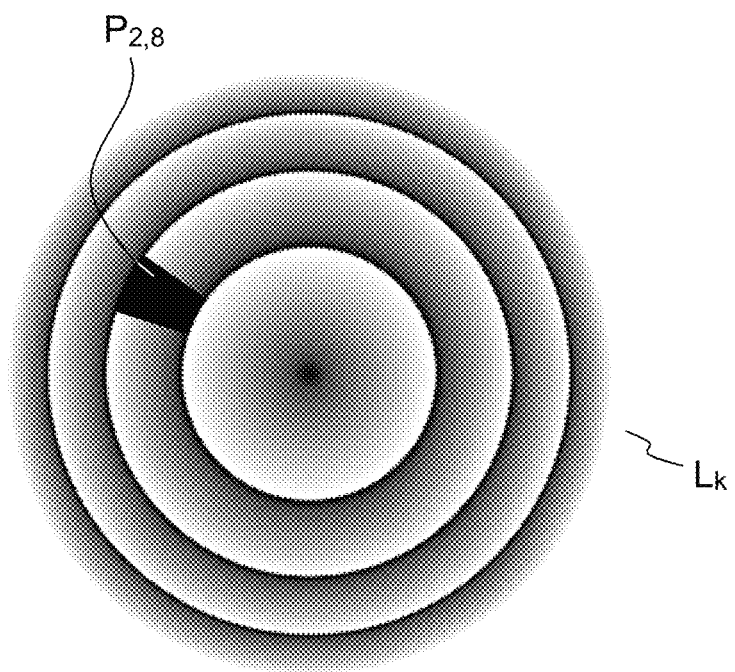
FIG. 5C depicts, in a subset of facets, an example in which, for one pixel of a facet, the surface of said pixels is altered.

FIG. 5B and FIG. 5C schematically depict a top view of a subset $L_k$ of concentric facets of Fresnel lens type (FIG. 5C). FIG. 5B schematically depicts this same lens but partitioned in the form of point regions or pixels.

As can be seen in the figures, the subset $L_k$ includes in this example 4 facets, designated $F_{k1}$, $F_{k2}$, $F_{k3}$, $F_{k4}$ in FIG. 5B, and the plane is partitioned into 20 angular sectors, which generates 20 average values $\phi_j$ of the azimuth φ.

A point region $P_{ij}$ can thus be defined by its polar coordinates. The radial coordinate i corresponds to the facet in which the point region is located and the angular coordinate j corresponds to an average value of the azimuth $\phi_j$. Thus, in this example, the point region $P_{2,8}$ is the region located on the facet $F_{k2}$, and at an average azimuth $\phi_8=(360/20)\times 8-((360/20)/2=135°$.

Such a point region has two dimensions, namely a width $\Lambda_i$ equal to the width of the facet $F_{ki}$ on which it is located (width of the ring resulting from the projection of the facet in a plane parallel to the plane of the component) and an arc length $\delta_i$ which depends on a predetermined azimuth resolution and on the radius, and therefore on the facet $F_{ki}$ on which the point region is located.

In practice, the azimuth resolution Res(azimut) varies between, for example, 180° for a partition of the plane into two (alternation between two graphical objects by azimuthal rotation) and a resolution of 1° for a partition of the plane into 360 (one graphical object per degree of azimuthal rotation).

The arc length $\delta_i$ depends on the radius and therefore on the facet $F_{ki}$ in question.

For example, for a resolution of 18° (partition of the plane into 20), for the first facet $F_{k1}$.

$$\delta_1 = (2*\pi/360°)*18°*25 \ \mu m = 7.8 \ \mu m.$$

For the fourth facet $F_{k4}$, $\delta_4 = (2*\pi/360°)*70 \ \mu m*18° = 22 \ \mu m$.

In general, the area $A(F_{ki})$ of a facet $F_{ki}$ may be expressed as follows:

$$A(F_{ki}) = \pi((\sum \Lambda_i)^2 - (\sum \Lambda_{i-1})^2) \qquad \text{[Math 4]}$$

For the first facet, the area of a circle is calculated, hence $(\Sigma \Lambda_{l-1})^2$ is 0.

The area of a pixel is therefore:

$$A(P_{ij}) = A(F_{ki}) * \frac{Res(azimut)}{360} \qquad \text{[Math 5]}$$

In practice, with a greater radial and azimuthal resolution, greater continuity in the movement will be observed when moving in tilt or azimuth respectively. The resolution of a graphical object is given by the distance between pixels of two juxtaposed subsets of facets. This distance depends on the diameter of a subset of facets and on the distance between the two subsets of facets which it is sought to minimize.

Figure 6A:
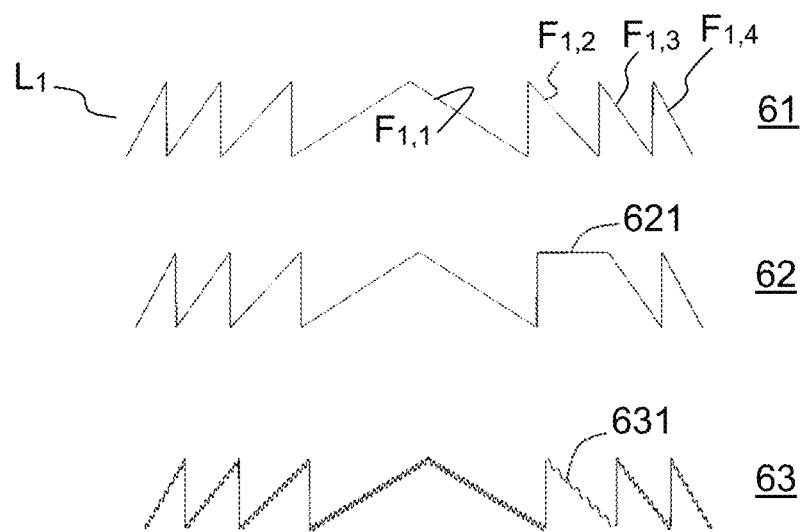
FIG. 6A shows a first example of a subset of 4 facets of Fresnel lens type, in which (a) no pixel has an altered surface, (b) the facet of a pixel is altered by cancellation of the slope and (c) the facet of a pixel is altered by means of a modification of a parameter of a sub-wavelength diffraction grating which modulates the subset of facets.
Figure 6B:
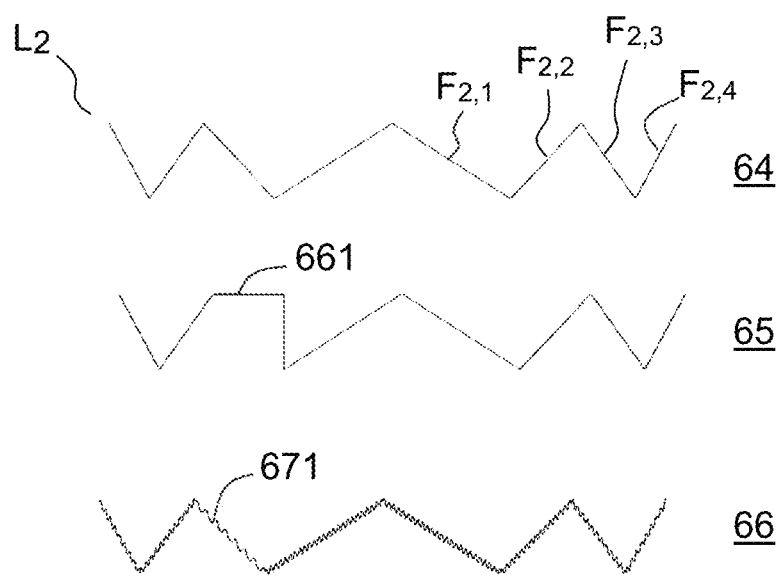
FIG. 6B shows a second example of a subset of 4 facets of axicon type, with the same height, in which (a) no pixel has an altered surface, (b) the facet of a pixel is altered by cancellation of the slope and (c) the facet of a pixel is altered by means of a modification of a parameter of a sub-wavelength diffraction grating which modulates the subset of facets.
Figure 6C:
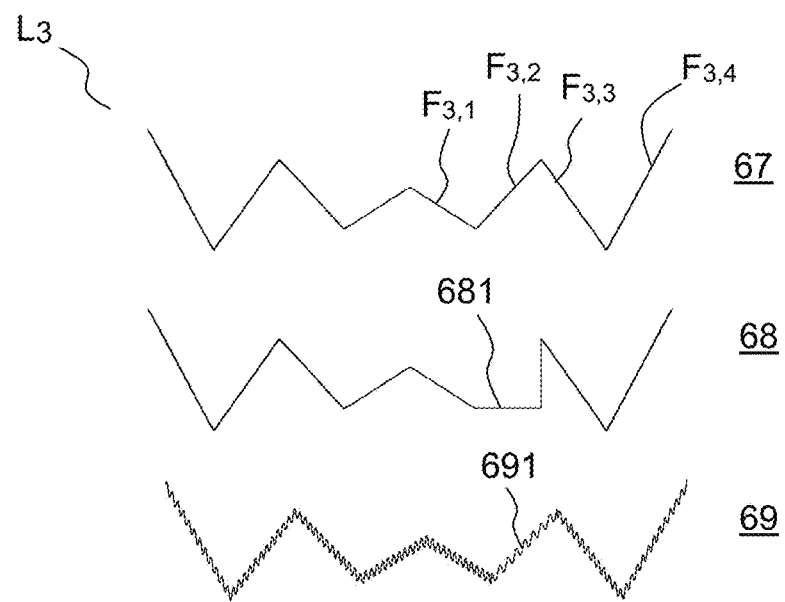
FIG. 6C shows a second example of a subset of 4 facets of axicon type, with the same width, in which (a) no pixel has an altered surface, (b) the facet of a pixel is altered by cancellation of the slope and (c) the facet of a pixel is altered by means of a modification of a parameter of a sub-wavelength diffraction grating which modulates the subset of facets.

FIGS. 6A, 6B and 6C show examples of means for obtaining a local alteration of the surface in subsets of facets in order to obtain the desired technical effect.

FIG. 6A thus shows a first example of a subset of facets $L_1$, formed of 4 concentric facets $F_{1,1}$, $F_{1,2}$, $F_{1,3}$, $F_{1,4}$, the subset of facets forming a structure of "Fresnel lens" type.

Diagram 61 shows the subset of facets in which no pixel has an altered surface.

In diagram 62, the facet $F_{1,2}$ is altered locally by cancellation of the slope in such a way as to form a pixel 621.

Diagram 63 shows a case in which the first pattern consisting of facets is modulated by a second pattern forming a periodic grating of predetermined period to produce, after deposition of the reflective layer, a resonant effect. In this example, the facet $F_{1,2}$ is altered locally by means of a modification of one or more parameters of the sub-wavelength diffraction grating so as to generate a pixel 631. Local surface alteration may also be formed by a local absence of the diffraction grating.

The grating is for example a sub-wavelength diffraction grating configured to produce a one- or two-dimensional wavelength subtractive filter, of "dielectric subtractive resonant filter" type, or a sub-wavelength diffraction grating configured to produce a resonant band-stop filter in reflection of "R'plasmon" plasmonic filter type.

The grating parameter that is modified locally is for example the period, the azimuth (or orientation of the grating vector), the depth of the grating or the profile, or a combination of these parameters.

In other embodiments, the first pattern consisting of facets may be modulated by a second pattern forming a periodic grating of predetermined period to produce, after deposition of the reflective layer, a resonant effect and therefore a colored effect, but the local alteration of the surface of a facet may result from a zero local slope.

FIG. 6B shows a second example of a subset of facets $L_2$, comprising 4 facets $F_{2,1}$, $F_{2,2}$, $F_{2,3}$, $F_{2,4}$, the subset of facets forming a structure of axicon type.

Diagram 64 shows the subset of facets in which no pixel has an altered surface.

In diagram 65, the facet $F_{2,2}$ is altered locally by cancellation of the slope in such a way as to form a pixel 661.

Diagram 66 shows a case in which the first pattern consisting of facets is modulated by a second pattern forming a periodic grating of predetermined period to produce, after deposition of the reflective layer, a resonant effect, for example a grating as described above.

In this example, as in the previous example, the facet $F_{2,2}$ may be altered locally by means of a modification of a parameter of the sub-wavelength diffraction grating so as to generate a pixel 671.

FIG. 6C shows a third example of a subset $L_i$ formed of 4 facets $F_{3,1}$, $F_{3,2}$, $F_{3,3}$, $F_{3,4}$, the subset of facets forming a structure of axicon type.

Unlike the example in FIG. 6B, the width of each facet is constant while the height is variable. For a given diameter of a subset of facets, this allows a greater number of facets and therefore better resolution of the graphical object.

Diagram 67 shows the subset of facets in which no pixel has an altered surface.

In diagram 68, the facet $F_{2,2}$ is altered locally by cancellation of the slope in such a way as to form a pixel 681.

Diagram 69 shows a case in which the first pattern consisting of facets is modulated by a second pattern forming a periodic grating of predetermined period to produce, after deposition of the reflective layer, a resonant effect, for example a grating as described above.

In this example, as in the previous example, the facet $F_{3,2}$ may be altered locally by means of a modification of a parameter of the sub-wavelength diffraction grating so as to generate a pixel 691.

Note that, in practice, the first pattern of the first structure may consist of a plurality of subsets of facets $F_{k,i}$ which all have a similar arrangement of facets, for example but not exclusively, so as to form subsets of facets of Fresnel lens or axicon type as shown in FIG. 6A, 6B or 6C. However, it is also possible to have a first pattern consisting of a plurality of subsets of facets, the subsets of facets not all having the same arrangement of facets. For example, there may be subsets of facets of both Fresnel lens or axicon type as shown in FIG. 6A, 6B or 6C. To be specific, the technical effect of the optical security component according to the present description may remain substantially the same, as long as the slopes of the facets which have a local alteration of the surface in the subsets of facets are in the same range of slopes. It is for example possible to provide subsets of facets comprising facets with slopes greater than the slopes of the facets which have a local alteration of the surface so as to create additional visual effects which are only apparent at much greater tilts and which may thus form additional authentication.

Figure 7:
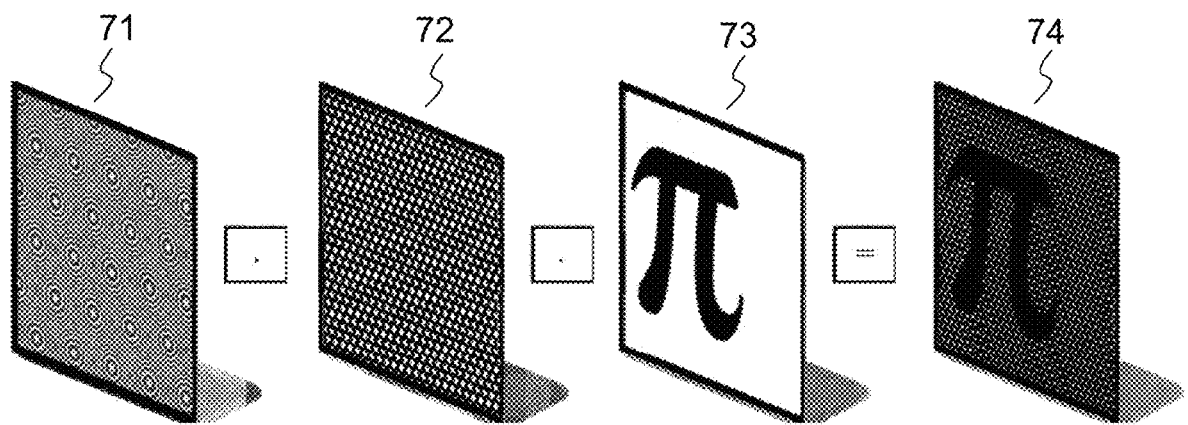
FIG. 7 schematically depicts the mathematical operations allowing the calculation of the structure, in one embodiment.

FIG. 7 schematically depicts mathematical operations for the calculation of the first diffractive structure, in one embodiment.

More specifically, the aim is to determine a two-dimensional matrix $F_{out}$ which codes the height at any point of the first diffractive structure, for example in grayscale. The calculation file thus determined may be used directly for the manufacture of the optical master, as will be discussed in more detail later.

FIG. 7 shows more specifically the mathematical operations making it possible to determine the contribution $F_{out}$ ($\alpha_i$, $\varphi_j$) to the two-dimensional matrix $F_{out}$, of a group of subsets of facets making it possible to generate a graphical object in a viewing angle defined by ($\alpha_i$, $\varphi_j$). The matrix S (diagram 71) represents, according to one example, all the subsets of facets. For example, on a surface of 5×5 mm² and with a subset of facets of diameter 150 µm, approximately 1300 subsets of identical facets will be contained in the first pattern of the diffractive structure because the surface area of a hexagon containing an inscribed circle of diameter of 150 µm is approximately 0.0195 mm².

The matrix $M(\alpha_i, \varphi_j)$ (diagram 72) represents the binary mask making it possible to isolate a viewing angle defined by ($\alpha_i$, $\varphi_j$) for each cell; for each pair ($\alpha_i$, $\varphi_j$), the matrix M is different. The matrix $I(\alpha_i, \varphi_j)$ (diagram 73) represents the binary image to be displayed at its associated angle, for each pair ($\alpha_i$, $\varphi_j$).

Diagram 74 shows the result $F_{out}(\alpha_i, \varphi_j)$ of a term-by-term multiplication of the matrices S, $M(\alpha_i, \varphi_j)$ and $I(\alpha_i, \varphi_j)$.

The two-dimensional matrix $F_{out}$ is then given by the equation:

$$F_{Out} = \sum_{\alpha_{i\_min}}^{\alpha_{i\_max}} \sum_{\varphi_j=0}^{\varphi_j=2\pi} S \cdot M(\alpha_i, \varphi_j) \cdot I(\alpha_i, \varphi_j) \qquad \text{[Math 6]}$$

It results from a sum over the set of matrices $F_{out}(\alpha_i, \varphi_j)$.

Figure 8A:
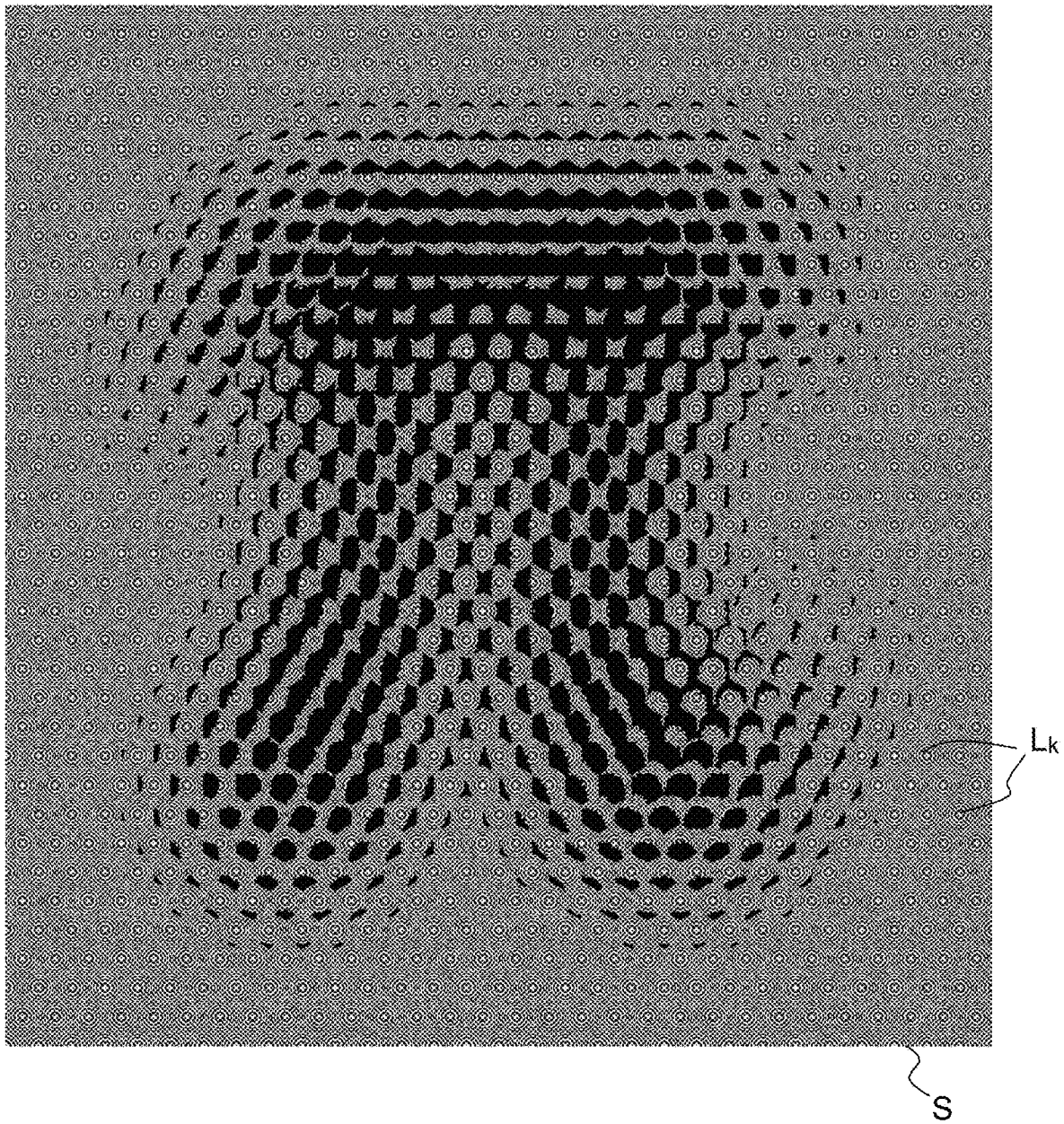
FIG. 8A shows the result of the calculation schematically depicted in FIG. 7, in one embodiment.
Figure 8B:
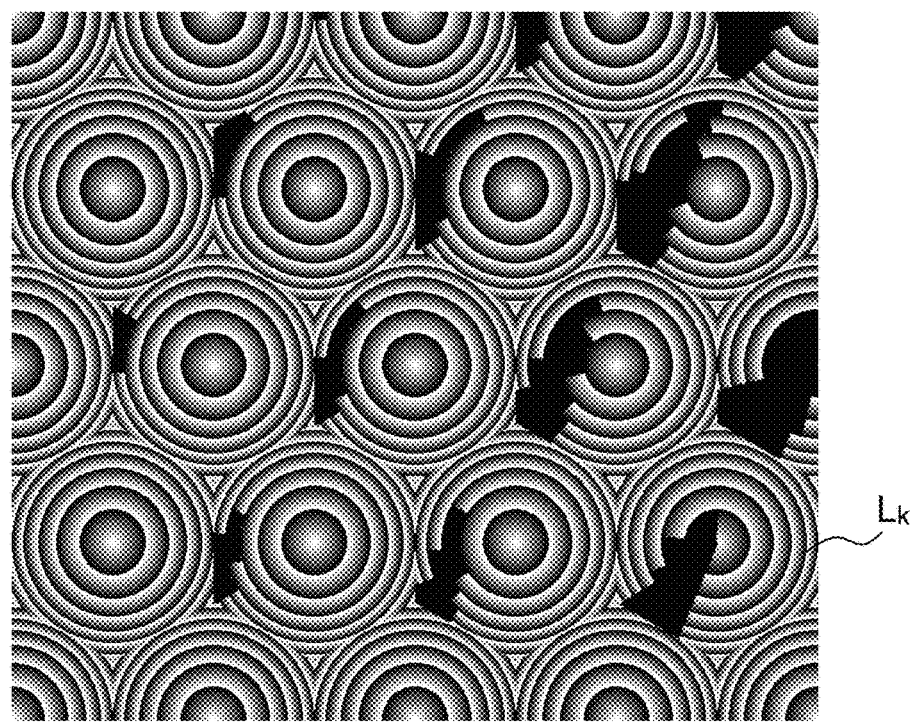
FIG. 8B shows a detail of FIG. 7.

By way of illustration, FIG. 8A shows a matrix $F_{out}$ obtained according to the calculation method described above and FIG. 8B is a detail of FIG. 8A, according to one example.

Height is encoded in grayscale, with a black pixel representing zero local slope.

In this example, the pattern includes 270 subsets of facets $L_k$ and 200 groups of subsets of facets.

Figure 9A:
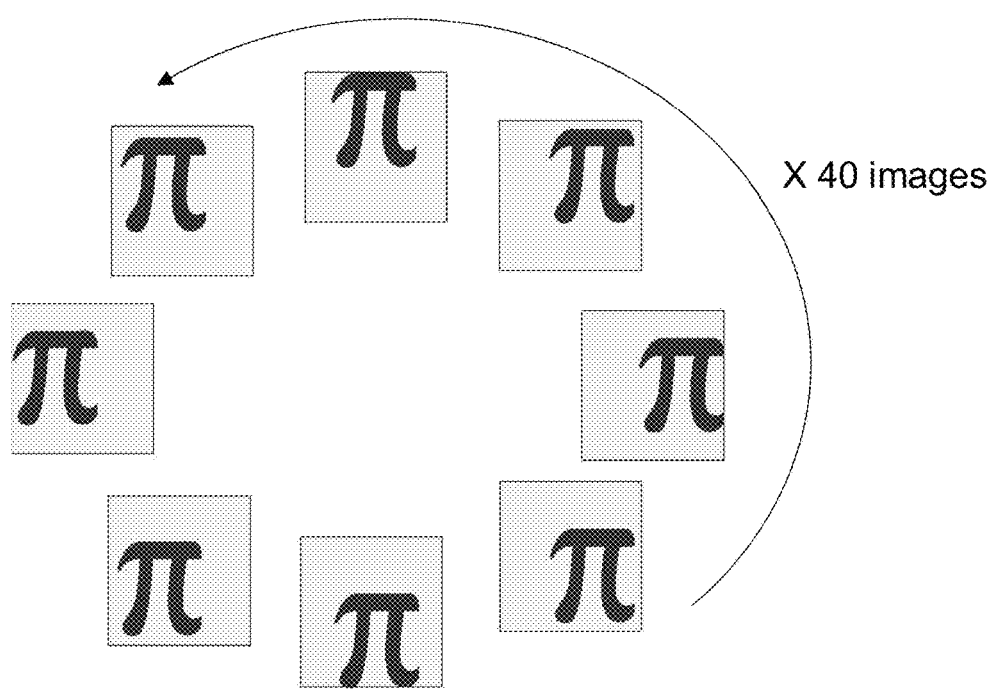
FIG. 9A schematically depicts the dynamic effect in azimuth obtained by means of a structure of the type shown in FIG. 8A.

FIG. 9A schematically depicts the dynamic effect in azimuth obtained by means of a structure of the type shown in FIG. 8A.

An observer can see the graphical object "π" shift during an azimuthal movement.

Figure 9B:
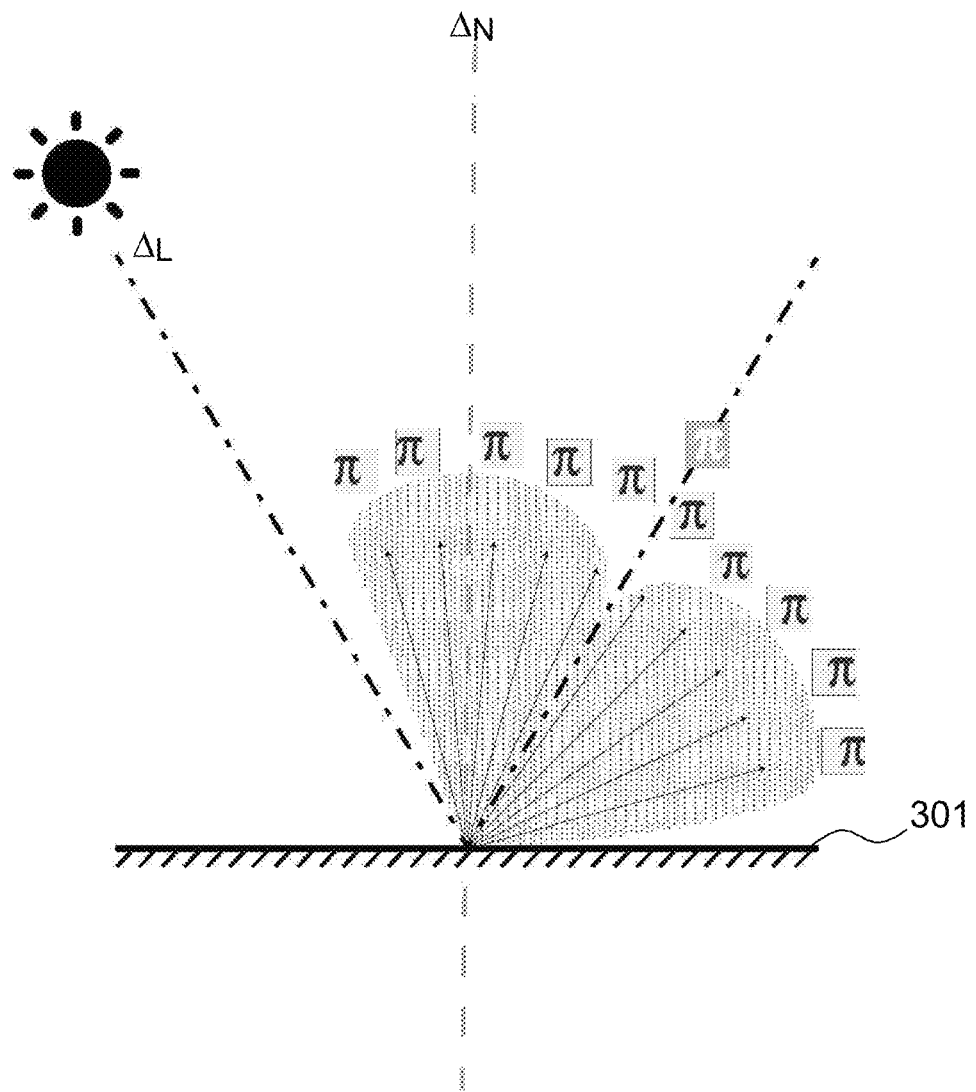
FIG. 9B schematically depicts the dynamic effect in tilt obtained by means of a structure of the type shown in FIG. 8A.

FIG. 9B schematically depicts the dynamic effect in tilt obtained by means of a structure of the type shown in FIG. 8A.

An observer can see the graphical object "n" shift during a tilting movement.

Note that it is possible, thanks to the component according to the present description, to produce an orthoparallax movement of a graphical object, that is to say that the graphical object moves parallel to the tilt axis.

In practice, an observer will be able to see an effect of floating of the graphical object with a depth linked to the magnitude of the movement. When the movement follows the movement of the observer, the image seems to float above the document and, conversely, floats below when the movement is opposed.

Examples of a method for manufacturing optical security components according to the present description will now be described.

A first step comprises designing said at least one first diffractive structure according to the embodiments described above, and possible other structures.

Next comes a step of recording an original copy, also called an optical master. The optical master is for example an optical support on which the structure(s) are formed.

The optical master may be formed by electronic or optical lithography methods known in the prior art, for example from a file $F_{out}$ as described above.

For example, according to a first embodiment, the optical master is produced by etching a resin that is sensitive to electromagnetic radiation, using an electron beam. In this embodiment, the structure presenting the first pattern modulated by the second pattern may be etched in a single step.

According to another embodiment, an optical lithography (or photolithography) technique may be used. The optical master is in this example a plate of photosensitive resin and the origination step is carried out by one or more exposures of the plate by projection of masks, of phase-shift mask type and/or of amplitude mask type, followed by development in an appropriate chemical solution. For example, a first exposure is carried out by projection of amplitude masks having transmission coefficients adapted such that, after development, a relief corresponding to the first pattern is formed, in the regions in which the first pattern is planned.

Next, a second overall exposure is carried out, in accordance with interference photolithography methods known to those skilled in the art, a diffraction grating corresponding to the second pattern may be recorded at least in first regions in which the second pattern is planned. Similar steps may be provided to generate other reliefs, such as a second diffraction grating in other regions. The order of formation of the patterns is arbitrary and may be modified. Subsequently, the development step is carried out. In this way, an optical master comprising a structure which results from the first pattern modulated by the second pattern is obtained after development The step of producing a metal copy of the optical master may then be carried out, for example by galvanoplasty, as mentioned previously, in order to obtain the metal replication matrix or "master". According to a variant, a step of matrix duplication of the metal master may be carried out to obtain a large production tool adapted to replicate the structure in industrial quantities.

The manufacture of the optical security component then comprises a replication step. For example, replication may be carried out by stamping (by hot embossing of the dielectric material) of the first layer 213 (FIGS. 2A, 2B) made of dielectric material of refractive index $n_1$, for example a low index layer, typically a stamping lacquer a few microns thick. The layer 213 is advantageously carried by the support film 211, for example a film of 12 µm to 100 µm made of polymer material, for example of PET (polyethylene terephthalate). Replication may also be performed by molding the layer of stamping lacquer before drying, followed by UV crosslinking ("UV casting"). Replication by UV crosslinking makes it possible in particular to reproduce structures with a broad range of depth and makes it possible to obtain more faithful replication. In general, any other high-resolution replication method known in the prior art may be used in the replication step.

This is followed by deposition, on the layer thus embossed, of all the other layers, for example the reflective layer 214, the layer of dielectric material 215 (optional), the security layer 216 (optional) which may be deposited uniformly or selectively to figure a new pattern and the layer of adhesive or lacquer type (217, 218), by a coating process.

Optional steps known to those skilled in the art are possible, such as partial demetallization of the reflective layer 214. It is also possible to introduce a continuous or discontinuous opaque layer to reinforce the contrast.

Although described through a certain number of embodiments, the optical security component according to the invention and the method for manufacturing said component include various variants, modifications and improvements which will be obvious to those skilled in the art, it being understood that these various variants, modifications and improvements fall within the scope of the invention as defined by the following claims.

REFERENCES

Ref. 1: WO2015154943
Ref. 2: WO2018224512
Ref. 3: US2010/0182221
Ref 4: US 20140367957
Ref. 5: EP 3598204
Ref. 6: WO2001003945
Ref. 7: U.S. Pat. No. 4,856,857
Ref 8: FR2509873
Ref. 9: EP2771724
Ref. 10: EP3099513

The invention claimed is:

1. An optical security component configured for authentication in reflected light, from at least a first viewing face, the component comprising:
   a first layer made of dielectric material, transparent in visible light;
   at least a first diffractive structure etched on said first layer; and
   a second layer, covering said first diffractive structure at least partially, and having a spectral band of reflection in visible light; and wherein:
   said first diffractive structure comprises at least a first pattern consisting of a set of facets arranged to form a plurality of subsets of facets, each subset of facets comprising one or more facets with symmetry of revolution arranged concentrically, said facet(s) of each subset of facets each having a slope with an angular value comprised, in absolute value, between a non-zero minimum angular value and a maximum angular value strictly less than 90°, said facet(s) of each subset of facets each having a given maximum height, a maximum lateral dimension of each subset of facets being smaller than 300 µm;
   in each group of a plurality of groups of subsets of facets, said subsets of facets each present, in a point region defined by an angular sector with polar coordinates comprising an angular coordinate and a radial coordinate which are identical for all subsets of facets of the group, a local alteration of a surface of the point region of each subset of facets that produces a graphical object for a given tilt angle and azimuth angle; at least said angular coordinate varies from one group to another, in such a way as to produce, when the component is illuminated along a given lighting axis, a dynamic visual effect observable in reflected light by a change of azimuth, said dynamic visual effect comprising a movement and/or a deformation of said graphical object.

2. The optical security component as claimed in claim 1, wherein said local alteration of the surface comprises a zero local slope of the surface.

3. The optical security component as claimed in claim 1, wherein said local alteration of the surface comprises a local modulation of the first pattern by a second pattern forming a periodic grating, of predetermined period included between 150 nm and 500 nm, said grating being determined so as to produce, after deposition of the second layer, a resonant effect.

4. The optical security component as claimed in claim 1, wherein in at least a first region, said first pattern is modulated by a second pattern forming a periodic grating, of predetermined period included between 150 nm and 500 nm, said grating being determined so as to produce, after deposition of the second layer, a resonant effect.

5. The optical security component as claimed in claim 4, wherein said local alteration of the surface comprises a local modification of a property of said periodic grating.

6. The optical security component as claimed in claim 1, wherein said polar coordinates vary from one group to another, in such a way as to further produce, when the component is illuminated along a given lighting axis, a dynamic visual effect observable in in reflected light by a change of tilt.

7. The optical security component as claimed in claim 1, wherein the second layer comprises a metal material.

8. The optical security component as claimed in claim 1, wherein the dielectric material of the first layer has a first refractive index and the second layer comprises a dielectric material having a second refractive index such that a difference between the second refractive index and the first refractive index is greater than or equal to 0.3.

9. The optical security component as claimed in claim 1, wherein the angular value of the slope of each facet of the set of facets is comprised, in absolute value, between 1° and 45°.

10. The optical security component as claimed in claim 1, wherein the facets of the set of facets have an identical height.

11. The optical security component as claimed in claim 1, wherein each subset of facets comprises at least 5 facets with symmetry of revolution arranged concentrically.

12. A secure object comprising a substrate and an optical security component as claimed in claim 1, deposited on said substrate.

13. A method for authenticating a secure object as claimed in claim 12, comprising:
   viewing said optical security component along a viewing axis forming a given viewing angle with the lighting axis;
   a tilting and/or azimuthal movement of said secure object resulting in a dynamic visual effect comprising a movement and/or deformation of said graphical object.

14. A method for authenticating a secure object as claimed in claim 12 by means of an optical imaging device comprising an optical imaging axis, said authentication method comprising:

forming an image of said optical security component, by means of the optical imaging device, said optical imaging axis forming a given viewing angle with the lighting axis;

a tilting and/or azimuthal movement of said secure object or a tilting and/or azimuthal movement of said optical imaging axis resulting in a dynamic visual effect comprising a movement and/or deformation of said graphical object.

15. The authentication method as claimed in claim 14, wherein the lighting axis and the optical imaging axis are coincident.

16. A method for manufacturing an optical security component intended to be viewed in reflected light from a viewing face, the method comprising:

depositing, on a support film, a first layer made of dielectric material, transparent in visible light;

forming, on said first layer, at least a first diffractive structure, depositing a second layer, covering said first diffractive structure at least partially, and having a spectral band of reflection in visible light, wherein:

said first diffractive structure comprises at least a first pattern consisting of a set of facets arranged to form a plurality of subsets of facets, each subset of facets comprising one or more facets with symmetry of revolution arranged concentrically, said facet(s) of each subset of facets each having a slope with an angular value comprised, in absolute value, between a non-zero minimum angular value and a maximum angular value strictly less than 90°, said facet(s) of each subset of facets each having a given maximum height, a maximum lateral dimension of each subset of facets being smaller than 300 μm;

in each group of a plurality of groups of subsets of facets, said subsets of facets each present, in a point region defined by an angular sector with polar coordinates comprising an angular coordinate and a radial coordinate which are identical for all subsets of facets of the group, a local alteration of a surface of the point region of each subset of facets that produces a graphical object for a given tilt angle and azimuth angle;

at least said angular coordinate varies from one group to another, in such a way as to produce, when the component is illuminated along a given lighting axis, a dynamic visual effect observable in reflected light by a change of azimuth, said dynamic visual effect comprising a movement and/or a deformation of said graphical object.

* * * * *